(12) United States Patent
Ishikawa et al.

(10) Patent No.: US 8,743,420 B2
(45) Date of Patent: Jun. 3, 2014

(54) IMAGE PROCESSOR AND IMAGE PROCESSING METHOD

(75) Inventors: Tomokazu Ishikawa, Yokohama (JP); Akitoshi Yamada, Yokohama (JP); Fumitaka Goto, Tokyo (JP); Tohru Ikeda, Yokohama (JP); Nobutaka Miyake, Yokohama (JP); Makoto Torigoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 13/110,503

(22) Filed: May 18, 2011

(65) Prior Publication Data

US 2011/0286020 A1    Nov. 24, 2011

(30) Foreign Application Priority Data

May 24, 2010  (JP) ................................. 2010-118671

(51) Int. Cl.
*H04N 1/405*    (2006.01)
(52) U.S. Cl.
USPC ........................................... 358/1.9; 358/504
(58) Field of Classification Search
USPC ........... 358/1.9, 2.1, 400, 406, 500–502, 504, 358/515–525, 527, 530, 468, 296
See application file for complete search history.

(56) References Cited

U.S. PATENT DOCUMENTS

| 6,025,929 | A | 2/2000 | Nakajima et al. | |
|---|---|---|---|---|
| 6,419,340 | B1 * | 7/2002 | Wickham et al. | 347/15 |
| 6,908,176 | B2 * | 6/2005 | Koitabashi et al. | 347/43 |
| 7,048,356 | B2 | 5/2006 | Ishikawa et al. | |
| 7,438,374 | B2 * | 10/2008 | Shibata et al. | 347/14 |
| 7,832,825 | B2 * | 11/2010 | Kim et al. | 347/15 |
| 2002/0063746 | A1 | 5/2002 | Suzuki et al. | |
| 2003/0085950 | A1 | 5/2003 | Yashima | |

FOREIGN PATENT DOCUMENTS

| CN | 1417035 A | 5/2003 |
|---|---|---|
| EP | 0863012 A1 | 9/1998 |
| EP | 1157840 A2 | 11/2001 |
| EP | 1308279 A2 | 5/2003 |
| EP | 1332882 A1 | 8/2003 |
| JP | 10-013674 A | 1/1998 |

(Continued)

OTHER PUBLICATIONS

Office Action mailed Jul. 30, 2013, in Japanese Patent Application No. 2010-118671, Japanese Patent Office.

(Continued)

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

The present invention is intended to provide an image processor that can reduce color unevenness occurring in a composite color image formed by overlapping different types of inks due to a variation in printing characteristic among a plurality of nozzles while suppressing a reduction in processing speed in generation of printing data. The image processor converts a color signal indicating the image represented by a plurality of elements to a color signal corresponding to the plurality of inks with use of a conversion table determined on the basis of ejection characteristics of nozzle groups corresponding to the plurality of inks so as to suppress color unevenness occurring in a composite color image due to a variation in ejection characteristic among the plurality of nozzles.

13 Claims, 12 Drawing Sheets

(56) References Cited

FOREIGN PATENT DOCUMENTS

| | | |
|---|---|---|
| JP | 2006-051677 A | 2/2006 |
| JP | 2007-320240 A | 12/2007 |
| JP | 2009-234014 A | 10/2009 |

OTHER PUBLICATIONS

Notification of First Office Action in Chinese Patent Application No. 201110130119.7 dated Jun. 5, 2013, State Intellectual Property Office of the People's Republic of China.

* cited by examiner

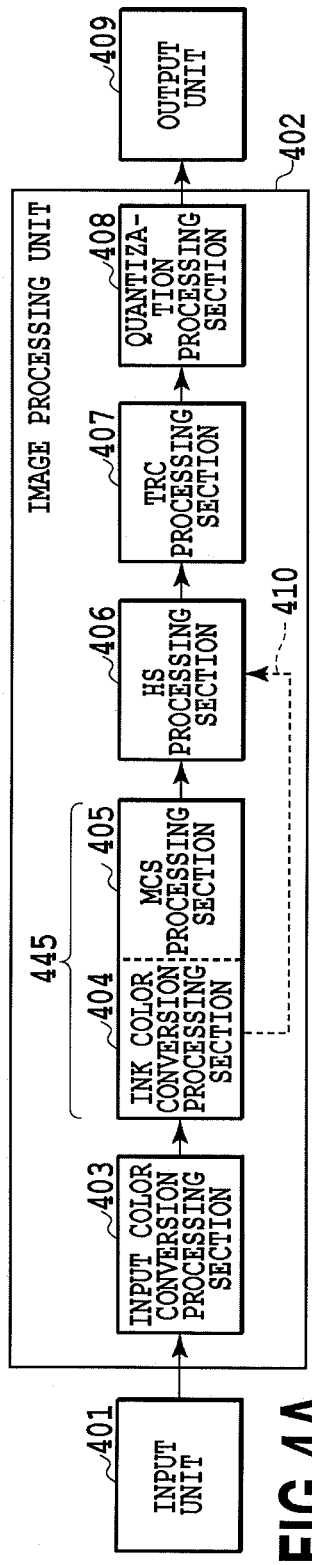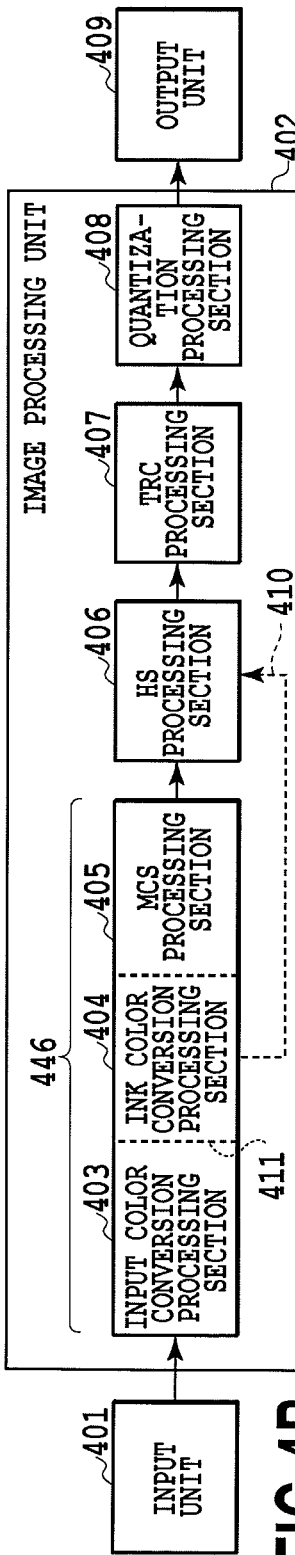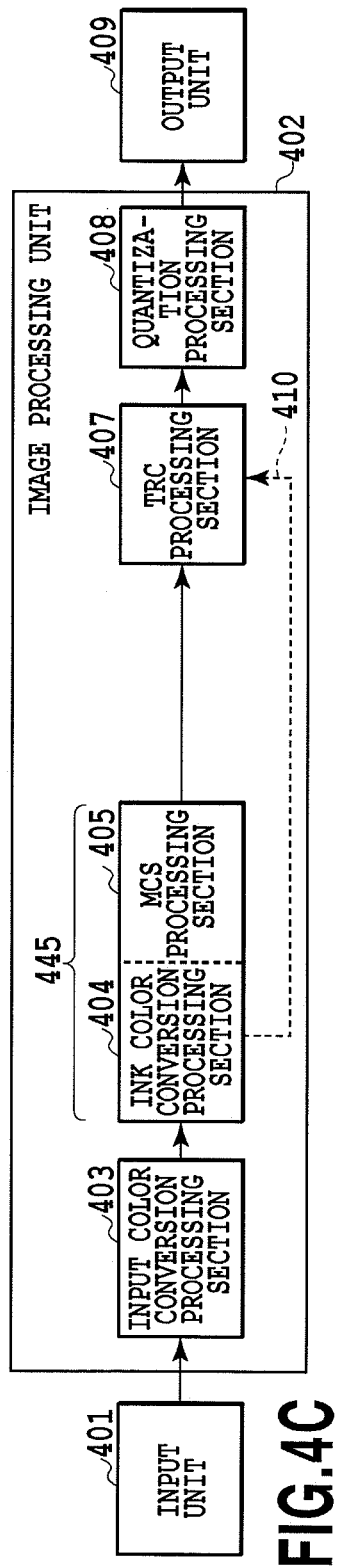

IMAGE PROCESSOR AND IMAGE PROCESSING METHOD

BACKGROUND OF THE INVENTION

1. Field of the Invention

The present invention relates to an image processor and an image processing method, and more particularly, to image processing for reducing density unevenness caused by a variation in ejection amount among a plurality of nozzles that eject ink.

2. Description of the Related Art

A printing head used in an inkjet type printer may have a variation in ejection amount among a plurality of nozzles due to manufacturing errors, and the like. If there is such a variation in ejection amount, density unevenness is likely to occur in a printed image.

Conventionally, it is known that, as processing for reducing such density unevenness, a head shading technique as disclosed in Japanese Patent Laid-Open No. H10-013674 (1998) is used. The head shading technique is a technique that corrects image data according to information on an ejection amount of each nozzle. This correction enables the number of finally printed ink dots to be increased or decreased to adjust a density in a printed image.

However, even in the case of using the head shading technique as described above, if two or more types of inks are overlapped to represent some color, a so-called color shift may occur, i.e., a color of an area printed with nozzles having a variation in ejection amount may be different from a color that is supposed to be printed. For example, the case of printing a dot with cyan and magenta inks to print a blue image is described. Due to a variation in ejection amount between nozzles, in an area where printing is performed with a nozzle having a larger magenta ink ejection amount than a standard amount, a size of a magenta ink dot is made larger than a standard size. Along with this, by the correction based on the head shading, the number of magenta ink dots printed in this area is made smaller than a standard number. As a result, a cyan dot, and a dot including a blue area and a magenta area around the blue area are mixed. Accordingly, a color in this area is made different from a color supposed to be printed in an area where blue dots formed by cyan and magenta inks for which respective nozzles have no variation in ejection amount are present.

SUMMARY OF THE INVENTION

The present invention has an object to provide an image processor that can reduce color unevenness occurring in an image having a color formed by overlapping different types of inks due to a variation in printing characteristic among a plurality of nozzles while suppressing a reduction in processing speed in generation of printing data.

In order to accomplish the above object, the present invention has the following configuration:

That is, a first aspect of the present invention is an image processor for a printer that performs a printing operation by using a first nozzle array corresponding to an ink of a first color and a second nozzle array corresponding to an ink of a second color different from the first color, the image processor comprising: a storage unit that stores a plurality of conversion tables; and a conversion unit that converts each of a plurality of the image data consisting of a first group including a plurality of elements, each image data corresponding to each of a plurality of unit areas, to an image data consisting of a second group including a plurality of elements, wherein the each element included in second group corresponds to each of a plurality of ink colors including the first color and the second color, each element included in first group does not correspond to the ink colors, wherein the plurality of the nozzle array are arrayed in a direction crossing to a nozzle arrangement direction, and wherein a printable area that the printer can print is divided into the plurality of unit areas, and the plurality of unit areas are arrayed in the nozzle arrangement direction.

A second aspect of the present invention is an image processing method for a printer that performs a printing operation by using a first nozzle array corresponding to an ink of a first color and a second nozzle array corresponding to an ink of a second color different from the first color, the image processing method comprising: a converting step that converts each of a plurality of the image data consisting of a first group including a plurality of elements, each image data corresponding to each of a plurality of unit areas, to an image data consisting of second group including a plurality of elements, wherein the each element, included in the second group corresponds to each of a plurality of ink colors including the first color and second color, each element included in first group does not correspond to the ink colors, wherein the plurality of the nozzle array are arrayed in a direction crossing to a nozzle arrangement direction, and wherein a printable area that the printer can print is divided into the plurality of unit areas, and the plurality of unit areas are arrayed in the nozzle arrangement direction.

According to the present invention, for color unevenness occurring in a composite color image formed by a plurality of types of inks due to a variation in ejection characteristic among a plurality of nozzles, a conversion table is used for each nozzle group including a predetermined number of nozzles to make correction, and thereby the color unevenness can be suppressed. Further, a reduction in processing speed in generation of printing data can be decreased.

Further features of the present invention will become apparent from the following description of exemplary embodiments (with reference to the attached drawings).

BRIEF DESCRIPTION OF THE DRAWINGS

FIGS. 4A to 4C are block diagrams respectively illustrating configurations of image processing units in inkjet printers according to one embodiment and variations of the embodiment of the present invention;

DESCRIPTION OF THE EMBODIMENTS

Embodiments of the present invention will hereinafter be described in detail with reference to the drawings.

Figure 1:
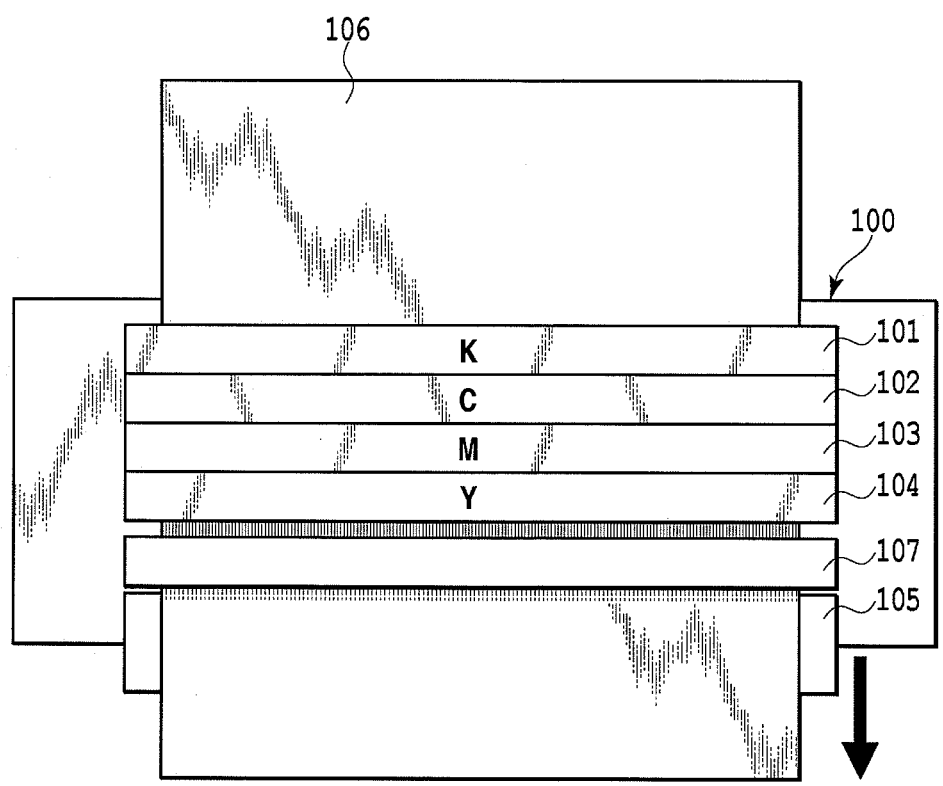
FIG. 1 is a diagram schematically illustrating an inkjet printer according to one embodiment of the present invention.

FIG. 1 is a diagram schematically illustrating a printer that is an inkjet printer according to one embodiment of the present invention. As illustrated in FIG. 1, the printer 100 is provided with printing heads 101 to 104 on a frame serving as a structural material of the printer. Each of the printing heads 101 to 104 is a so-called full-line type one in which a plurality of nozzles for ejecting each of a plurality of inks, i.e., black (K), cyan (C), magenta (M), and yellow (Y) inks, are arrayed along a predetermined direction in a range corresponding to a width of printing paper 106. A resolution of the nozzle arrangement in a nozzle array for each of the ink colors is 1200 dpi. Also, the printer 100 is provided with a scanner 107 that scans an image printed by the printing heads 101 to 104, or the like, in parallel with the printing head 104. In addition, the scanner 107 in the present embodiment has a resolution of 1200 dpi.

Figure 11:
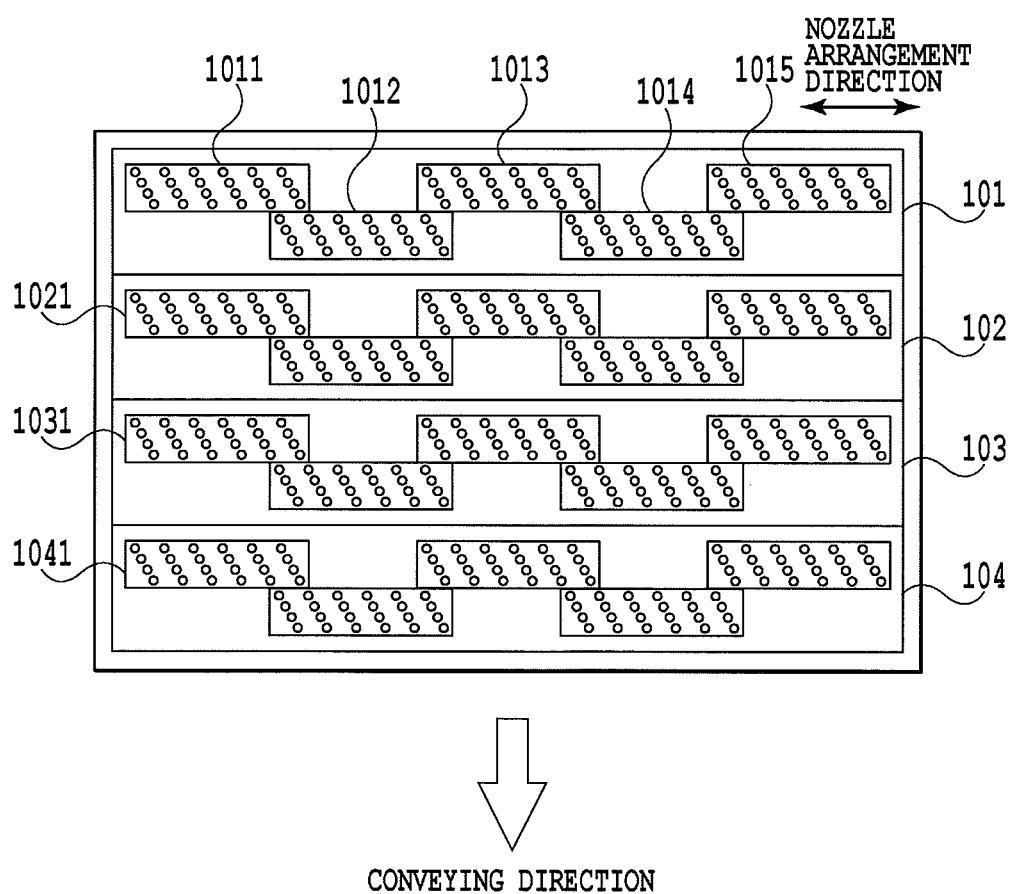
FIG. 11 is a schematic diagram showing the print heads 101 to 104 according to one embodiment of the present invention.

FIG. 11 is a schematic diagram showing the print heads 101 to 109 according to one embodiment of the present invention. Each of the print heads 101 to 109 has a plurality of ejection substrates which are arranged in order in the nozzle arrangement direction. The end portion of respective ejection substrates overlaps the end portion of the adjacent ejection substrate. Each of the ejection respective substrates has four nozzle arrays. For example, the print head 101 has ejection substrates 1011 to 1015 and the ejection substrates are arranged so as to be shifted in the nozzle arrangement direction as shown in FIG. 11. Further, the ejection substrate 1011 in the print head 101, the ejection substrate 1021 in the print head 102, the ejection substrate 1031 in the print head 103 and the ejection substrate 1091 in the print head 104 are arranged in a direction (conveying direction) crossing the nozzle arrangement direction.

The printing paper 106 as a printing medium is conveyed in a direction indicated by an arrow in the diagram by a conveying roller 105 (and another roller not illustrated in the diagram) that is rotated by driving force of a motor (not illustrated). Also, while the printing paper 106 is conveyed, from the pluralities of nozzles of the respective printing heads 101 to 104, the inks are ejected according to printing data, and thereby one raster images corresponding to the nozzle arrays of the respective printing heads are sequentially printed. By repeating such ink ejection operation from the respective printing heads onto the printing paper that is being conveyed, for example, a one-page image can be printed. Note that the printer applicable with the present invention is not limited to the full-line type printer described above. It is obvious from the following description that the present invention can also be applied to, for example, a so-called serial type printer that scans printing heads in a direction intersecting with a conveying direction of printing paper to perform printing.

Figure 2:
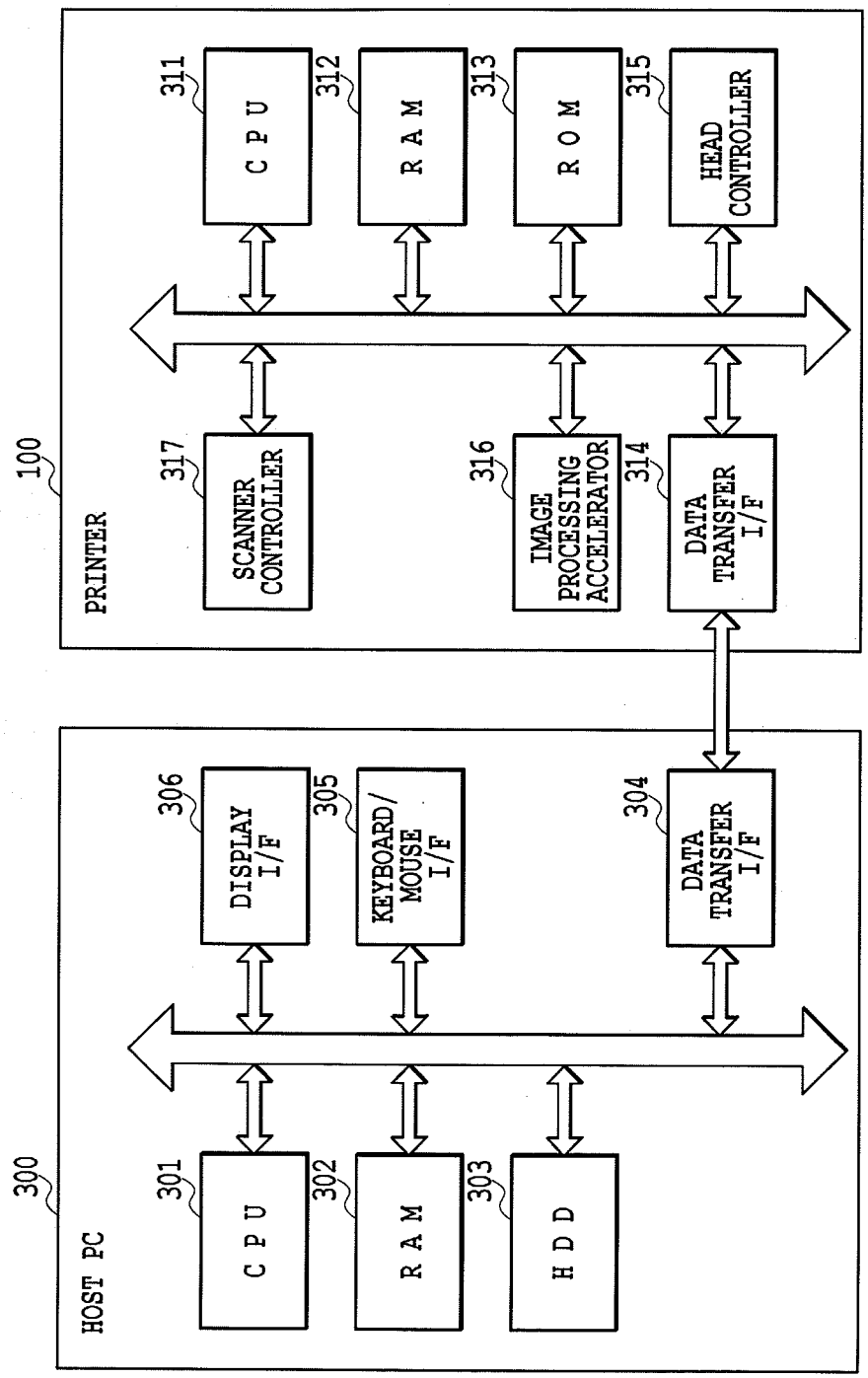
FIG. 2 is a block diagram illustrating a configuration of a printing system according to one embodiment of the present invention.

FIG. 2 is a block diagram illustrating a printing system according to one embodiment of the present invention. As illustrated in the diagram, the printing system is configured to have the printer 100 illustrated in FIG. 1, and a personal computer (PC) 300 that serves as a host device for the printer 100.

The host PC 300 is configured to mainly have the following components. A CPU 301 performs after-mentioned processing according to a program stored in an HDD 303 or RAM 302 that serves as a storage unit. For example, the CPU functions as a conversion data generation unit and switching unit that perform an after-mentioned conversion data generation step, table switching step, and the like. The RAM 302 is a volatile storage, and temporarily stores programs and data. Also, the HDD 303 is a nonvolatile storage, and stores programs and data as well. A data transfer I/F (interface) 304 controls data transmission/reception to/from the printer 100. As a connecting method for the data transmission/reception, a USB, IEEE 1394, LAN, or the like can be used. A keyboard/mouse I/F 305 is an I/F that controls HIDs (Human Interface Devices) such as a keyboard and mouse, and a user can provide input through the I/F. A display I/F 306 controls a display on a display (not illustrated). Also, a scanner controller 317 controls driving of the above-described scanner 107 on the basis of a control signal from the CPU 311.

On the other hand, the printer 100 is configured to mainly have the following components. A CPU 311 performs processing in each embodiment, which is to be described with FIGS. 4A to 4C and subsequent drawings, according to a program stored in a ROM 313 or RAM 312. The RAM 312 is a volatile storage, and temporarily stores programs and data. Also, the ROM 313 is a nonvolatile storage, and can store table data generated in processing in each embodiment, which is to be described with FIGS. 4A to 4C and subsequent drawings, and programs.

A data transfer I/F 314 controls data transmission/reception to/from the PC 300. A head controller 315 supplies printing data to the respective printing heads 101 to 104 illustrated in FIG. 1, and also controls the ejection operation of the printing heads. Specifically, the head controller 315 can be configured to read control parameters and printing data from a predetermined address of the RAM 312. When the CPU 311 writes the control parameters and printing data in the above predetermined address of the RAM 312, the head controller 315 activates processing to perform ink ejection from the printing heads. An image processing accelerator 316 is configured to be hardware, and performs image processing faster than the CPU 311. Specifically, the image processing accelerator 316 can be configured to read parameters and data necessary for the image processing from a predetermined address of the RAM 312. When the CPU 311 writes the parameters and data in the above predetermined address of the RAM 312, the image processing accelerator 316 is activated to perform the predetermined image processing. In the present embodiment, processing of generating table parameters (conversion data) used in an MCS processing section, which is to be described in each embodiment along with FIGS. 4A to 4C and subsequent drawings, is performed on the basis of software by the CPU 311. On the other hand, image processing at the time of printing, which includes processing in the MCS processing section, is performed on the basis of hardware processing by the image processing accelerator 316. Note that the image processing accelerator 316 is not necessarily an essential component, and the above processing of generating the table parameters and image processing may be performed only on the basis of processing by the CPU 311, depending on specifications of the printer.

In the following, described are some embodiments that are intended to reduce a color difference in a composite color that occurs due to a variation in ejection amount among the plurality of nozzles when the plurality of types of inks are used to print an image. In the conventional head shading technique that individually corrects data on the plurality of different types of inks, if the plurality of different types of inks are overlapped to represent some color, a difference in shade may occur.

Figure 3A:
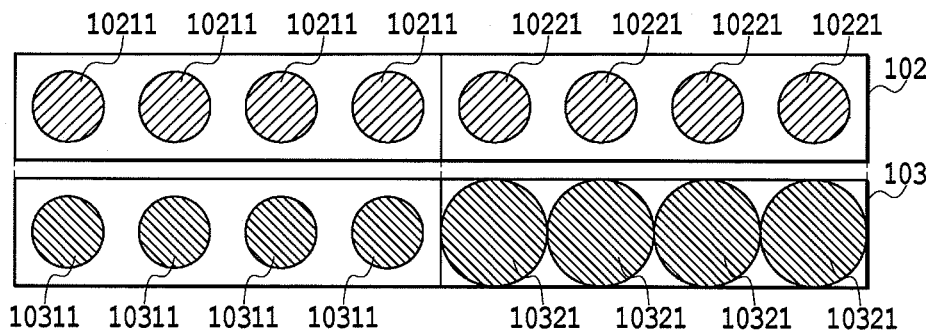
FIGS. 3A to 3C are diagrams for describing the occurrence of a color shift in the case of overlapping a plurality of different types of inks to represent some color.
Figure 3B:
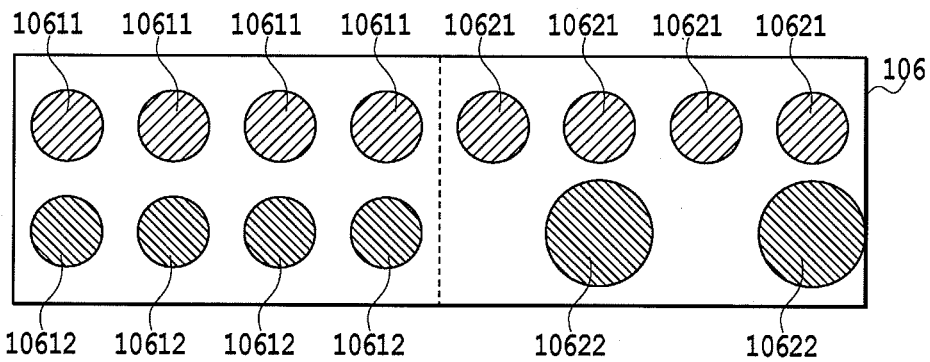
Figure 3C:
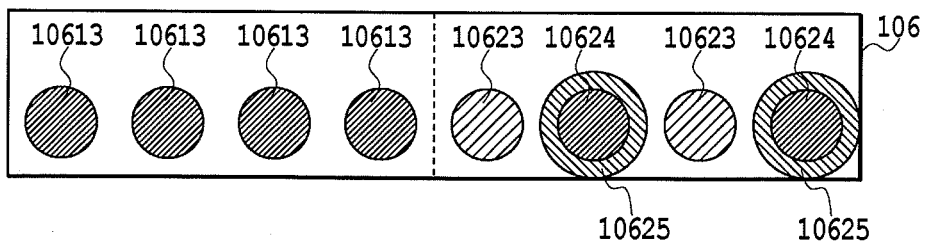

FIGS. 3A to 3C are diagrams for describing the occurrence of the color difference. Here it is explained using a part of each of print heads 102 and 103 explained in FIG. 11. In FIG. 3A, 102 represents a printing head that ejects the cyan ink serving as a first ink, and 103 represents a printing head that ejects the magenta ink that serves as a second ink. In FIG. 3A, for simplification of description and illustration, among the plurality of nozzles arrayed in each of the nozzle arrays in the respective printing heads, i.e., among the plurality of nozzles arrayed in each of a first nozzle array that ejects the cyan ink and a second nozzle array that ejects the magenta ink, only eight nozzles are illustrated. Also, as an example, in order to describe a color difference that occurs when blue that is a secondary color is printed with the cyan and magenta inks, only the two printing heads are illustrated. As will be described later, in the present embodiment, four nozzles among nozzles in each of the nozzle arrays are treated as one nozzle group.

Out of the eight nozzles of the cyan ink printing head 102, a nozzle group including four nozzles 10211 and a nozzle group including four nozzles 10221 are ones both having a standard ejection amount. On the other hand, out of the eight nozzles of the magenta printing head 103, a nozzle group including four nozzles 10311 on the left-hand side of the diagram has a standard ejection amount, but a nozzle group including four nozzles 10321 on the right-hand side has a larger ejection amount than the standard ejection amount. Note that the right-hand side four nozzles in the magenta ink printing head 103 illustrated in FIG. 3A are illustrated so as to have a larger size than a size of the left-hand side nozzles; however, this is to easily understand the difference in ejection amount, but does not illustrate an actual nozzle size relationship.

In the case of using the printing heads having such ejection amount characteristics, if image data are corrected on the basis of the conventional head shading, binary data (dot data) corresponding to the nozzles are finally obtained. The dot data on cyan and magenta are, if on the basis of the data, individual printings performed on the printing paper 106 without overlapping dots, represented as ones illustrated in FIG. 3B. Note that the example illustrated in FIG. 3B illustrates dots printed after the head shading processing has been performed on data on solid images, i.e., data on 100% duty images for both of cyan and magenta, and then binary processing has been performed.

FIG. 3B illustrates cyan dots 10611 and 10621 corresponding to the nozzles of the cyan ink printing head 102 and magenta dots 10612 and 10622 corresponding to the nozzles of the magenta ink printing head 103. Among them, the number of the dots 10622 in an area corresponding to the four nozzles 10321 having a larger magenta ink ejection amount than the standard ejection amount is decreased as a result of the correction of image data in the above corresponding area by the head shading. The example illustrated in the diagram illustrates an example where an area of a dot formed by the ink ejected from the magenta ink nozzle 10321 having the larger ejection amount is twice as large as a dot area for the case of the standard ejection amount. In this case, on the basis of the head shading correction, the number of dots is reduced by ½ (4 dots→2 dots). Note that to reduce the number of dots by ½ when the dot area is doubled is for simplification of description. It should be appreciated that, in practice, the number of dots is set so as to suppress an increase (or decrease) in density due to an increase (or decrease) in dot area caused by a variation in ejection amount, and achieve a standard density.

FIG. 3C illustrates an example where images having a color of blue, which is the secondary color, are printed by, on the basis of the dot data obtained in the above manner, ejecting the cyan and magenta inks on the printing paper 106 from the respective printing heads. In FIG. 3C, within a printable range of the printing paper 106, in an area on the left-hand side of the diagram, the cyan and magenta inks are formed with being overlapped, and thereby blue dots 10613 having a standard size are printed. On the other hand, in an area on the right-hand side of the diagram, which corresponds to the four nozzles 10321 having the larger magenta ejection amount, dots having the standard size and dots each in which dots having different sizes are overlapped are formed. That is, the cyan dots 10623 having the standard size, and the dots each including a blue area 10624 formed by overlapping the cyan and magenta inks and an magenta area 10625 around the blue area 10624 are printed.

As described, in the area on the right-hand side of the diagram where the blue solid images are printed, which corresponds to the magenta nozzles 10321 having the larger ejection amount, the following three types of dots or area are included:

Two standard sized cyan areas (dots) 10623,
Two blue areas 10624 each based on a standard sized cyan dot formed in a magenta dot having a larger size, and
Two magenta areas 10625 each present around the standard sized blue area 10624.

As described above, in the conventional head shading, image data on cyan and magenta are individually corrected to thereby adjust the numbers of cyan dots and magenta dots. As a result, an area of the two cyan areas (dots) 10623=an area of the two blue areas 10624=an area of the two magenta areas 10625 is met. In this case, if a color that is observed as a whole on the basis of optical absorption characteristics of the cyan and magenta areas 10623 and 10625 is the same as a color that is observed on the basis of an optical absorption characteristic of the blue areas 10624, a whole of this area has the same color as that of the blue area 10624.

However, as in the blue area 10624, in the case of overlapping a plurality of different types of inks to form a composite color, a color observed on the basis of an optical absorption characteristic of a corresponding area is often different from a color that is observed as a whole on the basis of a sum of optical absorption characteristics of respective areas corresponding to the plurality of inks. As a result, in a whole of the area, a difference in shade from a target color occurs. That is, due to a variation in ejection characteristic among nozzles used to perform printing in the same area, the blue images in the left-hand half area of the diagram and the blue images in the right-hand half area are viewed as different colors on the printing paper 106.

In addition, even in a multi-value printer that can vary a dot size, such as a four-value printer that performs printing with use of three-step dots, i.e., large, medium, and small dots, a variation in size may occurs among dots having each of the sizes due to a variation in ejection amount among nozzles. In this case, even if correction based on the conventional head shading is made, a color difference may also occur for the same reason as above. Accordingly, without limitation to the two-value printer, the present invention can also be applied to the multi-value, i.e., three or more value, printer.

Respective embodiments of the present invention described below are intended to reduce a color difference as described above by correction processing that is performed on image data including a set of a plurality of color signals before quantization.

(First Embodiment)

FIG. 4A is a block diagram illustrating a configuration of an image processing unit in an inkjet printer according to a first embodiment of the present invention. That is, in the present embodiment, the respective components for controlling and processing the printer 100 illustrated in FIG. 2 constitute the image processing unit. Note that it should be appreciated that the application of the present invention is not limited to this configuration. For example, the image processing unit may be configured in the PC 300 illustrated in FIG. 2, or a part of the image processing unit may be configured in the PC 300 and the rest of the image processing unit may be configured in the printer 100.

As illustrated in FIG. 4A, an input unit 401 inputs image data transmitted from the host PC 300 and passes it to the image processing unit 402. The image processing unit 402 is configured to have an after-mentioned input color conversion processing section 403, ink color conversion processing & MCS processing section 445, HS processing section 446, TRC processing section 407, and quantization processing section 408.

In the image processing unit 402, first, the input color conversion processing section 403 converts the input image data from the input unit 401 to image data corresponding to a color reproduction range of the printer. In the present embodiment, the image data to be inputted is data indicating color coordinates (R, G, B) in a color space coordinate system such as sRGB serving as expression color of a monitor. The input color conversion processing section 403 converts the input image data R, G, and B each having 8 bits to the image data (R', G', B') corresponding to the color reproduction area of the printer, which corresponds a color signal including a plurality of elements, by a method such as matrix calculation processing or processing using a three-dimensional lookup table. In the present embodiment, a conversion table is used, and interpolation calculation is used together with the conversion table to perform the conversion processing. In addition, a resolution of the 8-bit image data handled in the image processing unit 402 is 600 dpi, and a resolution of binary data obtained as a result of quantization by the quantization processing section 408 is, as will be described later, 1200 dpi.

The ink color conversion processing & MCS processing section 445 integrally performs, as a conversion unit in the present embodiment, processing of conversion to ink color data and of reduction of a color difference on the device color image data obtained by the input color conversion processing, and outputs the ink color data in which the color difference is reduced.

This processing is also performed with use of a conversion table, which is a three-dimensional lookup table, as will be described later. This processing enables, even if there a variation in ejection amount among the nozzles of each of the printing heads in the output unit 409, the above-described color difference due to the variation to be reduced. In addition, in the ink color conversion & MCS processing section 445 serving as the conversion unit of the present embodiment, the ink color conversion section 404 converts the image data R, G, and B each having 8 bits processed by the input color conversion processing section 403 to the image data based on the color signal data on the inks used in the printer. The printer 100 of the present embodiment uses the plurality of inks, i.e., black (K), cyan (C), magenta (M), and yellow (Y), and therefore the image data based on the RGB signal are converted to the image data including K, C, M, and Y color signals each having 8 bits. This ink color conversion processing is also performed with use of a three-dimensional lookup table together with interpolation calculation, as with the above-described input color conversion processing section. Alternatively, as another conversion method, as described above, a method such as matrix calculation processing can also be used. Specific content of the table in the ink color conversion & MCS processing section 445 and the processing using the table will be described later.

The HS (Head Shading) processing section 406 performs processing of inputting the image data based on the ink color signal, and converting the data having 8 bits for each of the ink colors to image data based on a ink color signal depending on an ejection amount of each of the nozzles constituting the printing heads. That is, this processing is the same processing as the above-described conventional head shading processing. In the present embodiment, a one-dimensional lookup table is used to perform this HS processing.

The TRC (Tone Reproduction Curve) processing section 407 makes correction for adjusting the number of dots printed in the output unit 409 for each of the ink colors on the HS processed image data including ink color signals each having 8 bits. That is, a relationship between the number of dots to be printed on the printing medium and a density realized by the dots having the number may not be linear, and therefore, to make the relationship linear, the TRC processing section 407 corrects the image data each having 8 bits to adjust the number of dots to be printed on the printing medium.

The quantization processing section 408 performs quantization processing on the ink color image data each having 8 bits, 256 values processed in the TRC processing section 407, and obtains binary data each having 1 bit. To do this, in the present embodiment, first, conversion to ink color based index data each having 3 bits, 5 values of "0" to "4" is performed. The index data "0" to "4" correspond to patterns in which 0 to 4 dots are arranged in 2 pixels×2 pixels having a resolution of 1200 dpi. Note that it should be appreciated that to apply the present invention, a configuration of the quantization processing section 408 is not limited to this example. For example, a configuration may be employed in which the 8-bit image data is binarized to thereby directly obtain the binary data (dot data). Also, as a method for the quantization processing, the present embodiment employs an error diffusion method, but may employ another pseudo halftone processing such as a dither method.

The output unit 409 drives the printing heads on the basis of the dot data obtained by the quantization, and ejects the respective color inks onto the printing medium to perform printing. The output unit 409 is, specifically, configured to have a printing mechanism provided with the printing heads 101 to 104 illustrated in FIG. 1.

Figure 12A:
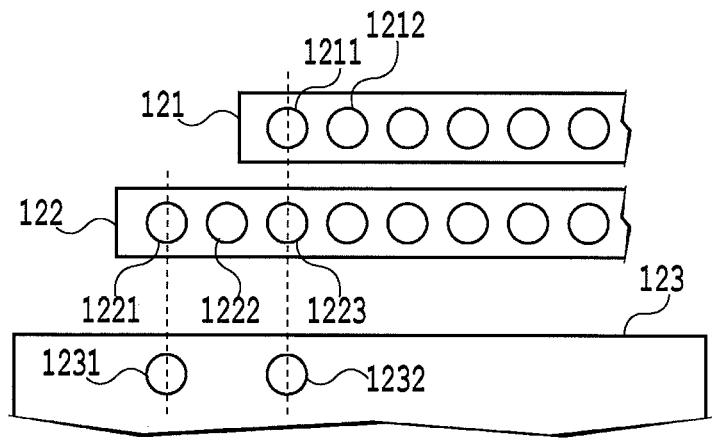
FIGS. 12A to 12C are diagrams for describing a position displacement correction of a printing head.
Figure 12B:
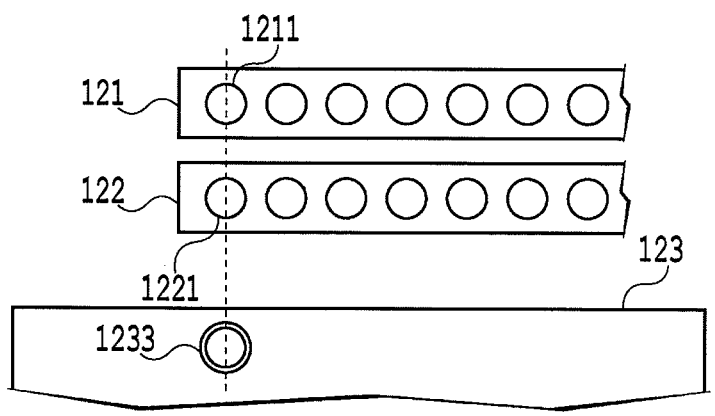
Figure 12C:
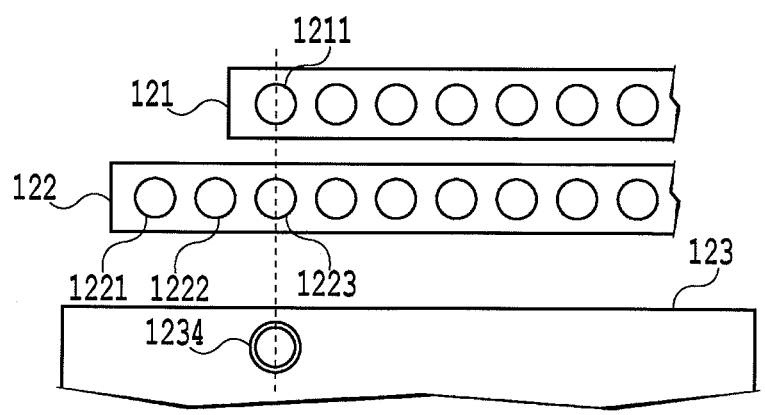

Next, FIGS. 12A to 12C are used to describe a position displacement correction of a printing head in the nozzle array direction, which is made before the MCS processing. As will be described later, the MOS processing is processing that, for each unit area on the printing medium, uses a conversion table to convert image data corresponding to a nozzle that performs printing in each unit area. This enables a color difference between unit areas due to an ejection amount variation between nozzles to be reduced. In order to perform the MCS processing, the conversion table should be created for each type of data corresponding to a nozzle group corresponding to a unit area; however, at the time of the creation, which nozzle corresponds to each unit area should be already set. That is, before the MCS processing is performed, a correspondence between each unit area on the printing medium and a nozzle should be assigned.

The correspondence between each unit area and a nozzle is, in consideration of an influence of an error at the time of attaching a printing head, or attaching an ejecting board to the printing head, determined with the printing head being attached to the printer. This is because if the printing head is displaced in the nozzle array direction, a nozzle that performs printing in each unit area is changed. In such a case, a so-called "position displacement correction" that corrects a displacement between a position on the printing medium and a nozzle used for printing is made. When the position displacement correction is made, it should be made before the creation of a conversion table that converts image data corresponding to a nozzle that performs printing in each unit area.

FIGS. 12A to 12C are used to describe a position displacement correction method. FIG. 12A illustrates a state where when a plurality of printing heads that eject different inks are attached, position displacement in the nozzle array direction occurs. In the diagram, the "position displacement correction" is not made. In the diagram, a printing head 121 that ejects a cyan ink, and a printing head 122 that ejects a magenta ink are displaced each other in the nozzle array direction (left-right direction in the diagram) by an amount corresponding to two nozzles. In this case, if the inks are ejected from end nozzles of the respective printing heads to thereby attempt to form a blue color dot, because the position displacement occurs between the printing heads, a cyan dot 1231 ejected from a cyan nozzle 1211 that is the end nozzle, and a magenta dot 1232 ejected from a magenta nozzle 1221 are not overlapped, and therefore the blue color dot cannot be formed.

FIG. 12B is a schematic diagram for describing a method for making the position displacement by adjusting positions of the printing heads in the printer in the nozzle array direction. By physically aligning the printing head 121 and the printing head 122 with each other, the adjustment is made so as to align the cyan nozzle 1211 and the magenta nozzle 1221 with each other with respect to the conveying direction of the printing medium to thereby overlap the dots. Based on this method, the cyan dot ejected from the cyan nozzle 1211 and the magenta dot ejected from the magenta nozzle 1221 are land on the same position, and thereby a blue dot 1233 can be formed. This method is one that uses a screw or the like for an alignment reference to mechanically adjust attachment positions of the printing heads with respect to the printer.

FIG. 12C is a schematic diagram for describing a method for making the position displacement by correcting image data distributed to each nozzle of the printing heads. In this method, when the image data are allocated to the respective printing heads, nozzles to which the image data for forming the respective color dots to be arrayed to the same position in the nozzle arrangement direction are allocated are changed to the nozzles which are arrayed in the same position in the nozzle arrangement direction. In the case of the diagram, a change is made such that image data allocated to the magenta nozzle 1221 of the printing head 122 in FIG. 12A are allocated to a magenta nozzle 1223. Based on this method, the cyan dot ejected from the cyan nozzle 1211 and a magenta dot ejected from the magenta nozzle 1223 land on the same position, and thereby a blue dot 1234 is formed. Similarly, for the other nozzles, image data to be allocated are displaced in the nozzle array direction by the amount corresponding to two nozzles, and thereby corrections can be made.

As described above, in the case of position displacement between printing heads, the method that adjusts positions of the printing heads in the nozzle array direction to thereby align nozzles, and the method that a nozzle to which image data are allocated is changed to a nozzle aligned in the conveyance direction are known. Based on any of these methods, a placement position displacement occurring when a plurality of printing heads for different ink colors are displaced each other in the nozzle arrangement direction can be corrected.

By making such a position displacement correction, a correspondence relationship between nozzles corresponding to each unit area is set. As described above, the MCS processing that is a feature of the present invention should be performed with the correspondence between each unit area on the printing medium and a nozzle being set. If a position in the conveying direction is not displaced, it is not necessary to make the position displacement correction; however, in the case of making the position displacement correction, the position displacement correction should be made at timing before the MCS processing to make alignment. Note that the position displacement correction method is not limited to any of the above two methods, but may be any other method if the method includes a process for setting the correspondence relationship between a unit area and a nozzle.

Figure 5A:
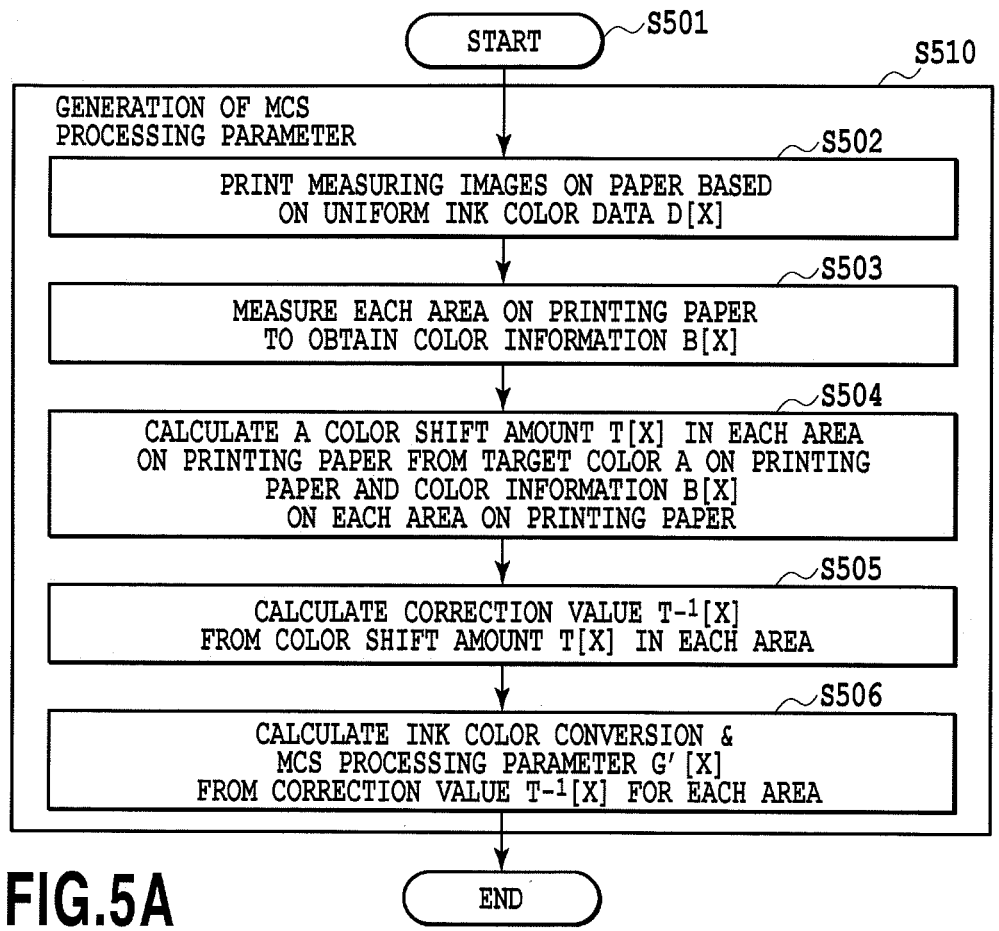
FIGS. 5A and 5B are flowcharts respectively illustrating processing of generating a parameter of a table used in a processing section 445 illustrated in FIG. 4A, and processing using the table in the processing section 445.
Figure 5B:
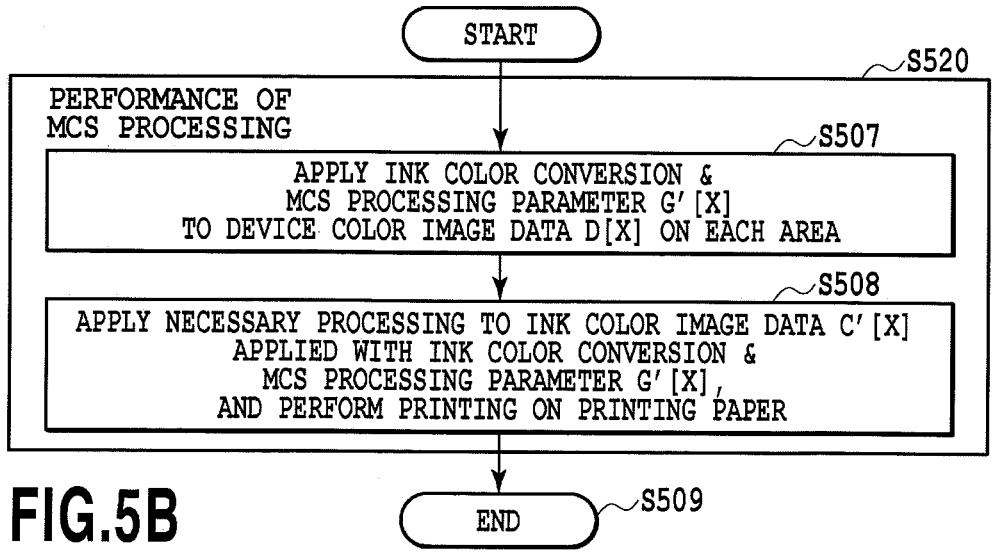

FIGS. 5A and 5B are flowcharts respectively illustrating processing of generating the conversion table used in the ink color conversion & MCS processing section 445 illustrated in FIG. 4A and processing using the above conversion table to generate the printing data in the ink color conversion & MCS processing section 495.

The processing S510 illustrated in FIG. 5A is processing (conversion table generation processing) of generating parameters of the three-dimensional lookup table that is the conversion table used in the ink color conversion & MCS processing section, and has respective processing steps of Steps S502 to S506. In the present embodiment, the processing S510 is one that is performed when the printer has been manufactured, the printer has been used for a predetermined period of time, or a predetermined amount of printing has been performed. That is, the processing S510 can also be performed as so-called calibration, on the basis of which the table parameters corresponding to the content of the lookup table are updated.

On the other hand, the processing S520 illustrated in FIG. 5B is processing that is, at the time of printing with the printer, in order to generate corresponding printing data, performed by the MCS processing section 405 as part of the image processing performed by the image processing unit 402 illustrated in FIG. 4A. This processing has respective processing steps of Steps S507 and S508. Note that it should be appreciated that, to apply the present invention, timing when the table parameter generation processing is performed is not limited to that in the above example. For example, to perform the processing S520 for printing, the table parameter generation processing may be performed before the processing S520.

First, the processing S510 for generating the table parameters illustrated in FIG. 5A is described.

In the present embodiment, after the table parameters of the HS processing section 406 have been generated, the table parameters of the MCS processing section are generated. For this reason, at the time of Step S501 where this processing is activated, the table parameters of the HS processing section have already been generated (updated). Regarding the generation of the table parameters of the HS processing section, the case where the magenta ink printing head 103 has a variation in ejection amount illustrated in FIG. 3A is described. A table parameter corresponding to the printing head 103 is a parameter that makes correction that decreases the number of dot data in the area corresponding to the right half nozzle group 10321 to a half of the number of dot data in the area corresponding to the left half nozzle group 10311. Also, in the case where in the cyan ink printing head 102, each of the nozzles has an ejection amount characteristic illustrated in FIG. 3A, i.e., in the case where all of the nozzles have the standard ejection amount, a table parameter of the HS processing section 406 is a parameter that converts image data to the same data. As described above, in the present embodiment, when the table parameters of the ink color conversion & MCS processing section 445 are generated or updated, the table parameters of the HS processing section are generated beforehand. This enables a color difference in composite color due to a variation among nozzles, which occurs at the time of the generation, to be appropriately reduced by total processing by the ink color conversion & MCS processing section 445 and the HS processing section 406.

First, in Step S502, among the image data that is to be inputted to the ink color conversion & MCS processing section 445 and represented by R, G, and B elements, sets of R, G, and B representing colors having a large color difference are printed as measuring images (patches) on the printing medium with use of all of the nozzles of the respective printing heads. Specifically, among grid points defined by combinations of values obtained by equally dividing 0 to 255 of R, G, and B by, for example, 17, grid points where the color difference largely changes are selected, and the sets of R, G, and B corresponding to these grid points are printed as the measuring images. The grid points where the color difference increases can be selected among the grid points defined by the above combinations of the values obtained by the equal division by 17 by preliminarily knowing a color having a significant color difference, for example, as in the case of a set of R=0, G=0, and B=255 corresponding to the blue image described with FIG. 3A. Note that it should be appreciated that the selection of the grid points where the colors are printed as the measuring images is not limited to the above example. For example, sets of R, G, and B where the color difference becomes equal to or more than a predetermined value may be set to print all of the sets as the measuring images. In short, depending on a calculation load or memory capacity, sets of color signals for printing the measuring images can be set.

In the present embodiment, regarding each of data on the measuring images set as described above, a plurality of images constituting it have a resolution of 600 dpi, and data on the plurality of images are data representing a uniform color because sets of R, G, and B values in the measuring image data are the same. The image data I[X]=(Rin, Gin, Bin) on the measuring image serve as 8-bit image data (hereinafter referred to as device color image data D[X]) has been subjected to the ink color conversion processing by the ink color conversion processing section 404 illustrated in FIG. 4A.

The device color image data D[X] bypasses the processing in the MCS processing section 405, and are inputted to the HS processing section 406 through a bypass processing path 410 indicated by a dashed line 410 of FIG. 4A. That is, the data inputted to the HS processing section 406 serve as ink color data C[X]=(C, M, Y, K) having been subjected to the conversion processing by only the ink color conversion processing section 404 in the ink color conversion & MCS processing section 445. The specific processing will be described later in detail. Alternatively, as another method, in the case of not passing through the bypass processing path, the MCS processing section 404 uses the table in which the table parameters indicate a correction amount of 0 to perform the correction processing on the ink color data C[X]. In this case, the ink color data C[X] represent the same color signal between before and after the correction by the MCS processing section 404.

Subsequently, through the HS processing section 406, TRC processing section 407, and quantization processing section 408, printing is performed on the printing paper 106 in the output unit 409. In this process, the image data on the measuring images are converted to the image data based on ink color signals by the ink color conversion processing section 405, and as one of the measuring image data, a datum representing 100% duty cyan and magenta forming blue described above with FIG. 3C is obtained. That is, as one of the image data on the measuring images, the datum of (K, C, M, Y)=(0, 255, 255, 0) is obtained. Then, by the processing in the subsequent HS processing section 406 and subsequent processing, the measuring image data formed by the dot data illustrated in FIG. 3B are obtained. In the following description, for simplification of description, only table parameters corresponding to grid points indicating the image data on the blue measuring images are described in terms of corresponding generation processing.

In the device color image data D[X], X represents a value that identifies a pixel having a resolution of 600 dpi in the measuring image data. In other words, X represents a value that identifies, as one 300 dpi unit, a pixel area (hereinafter referred to as an area) corresponding to one nozzle group including four successive nozzles in the nozzle array of each of the printing heads for the ink colors. Accordingly, a resolution of dots to be printed is 1200 dpi corresponding to the nozzle array resolution, and therefore two pixels related to the image data D[X] having the resolution of 600 dpi are identified by X correspondingly to one of the above areas. The device color image data D[X] are, as described above, subjected to the processing in the ink color conversion processing section 405 and subsequent processing, and in the output unit 409, the measuring images based on the data are printed.

Figure 6A:
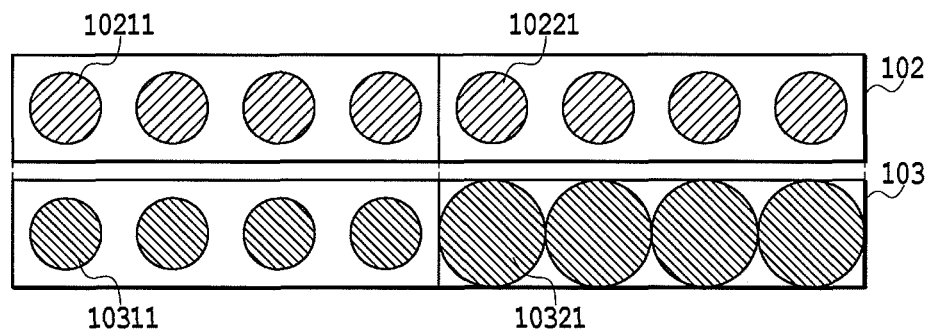
FIGS. 6A and 6B are diagrams for describing a measuring image printed in Step S502 of FIG. 5A according to the present embodiment.
Figure 6B:
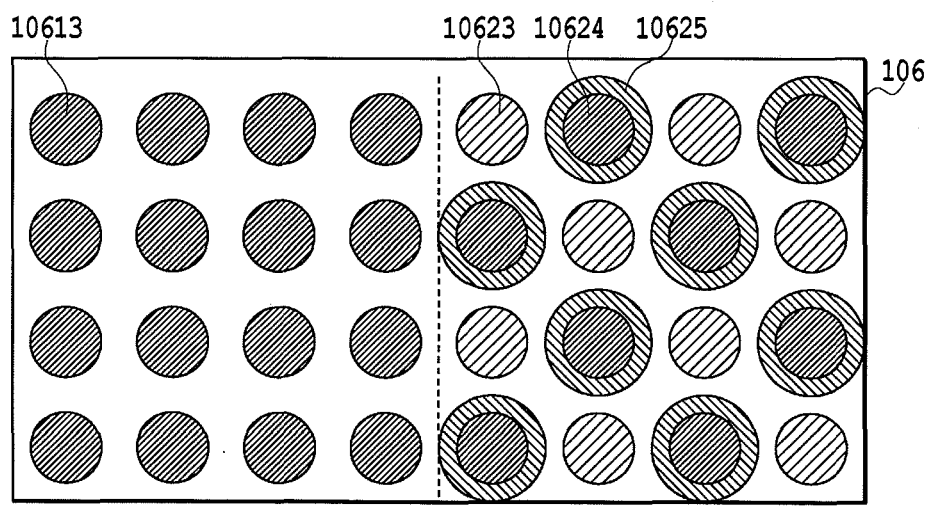

FIGS. 6A and 6B are diagrams for describing the printing of the measuring images in above Step S502. In FIGS. 6A and 6S, the same elements as those illustrated in FIGS. 3A to 3C are denoted by the same reference numerals to omit description thereof.

FIG. 6A illustrates, as with the example illustrated in FIG. 3A, an example where among the nozzles of the magenta printing head 103, a nozzle group including four nozzles on the right-hand side of the diagram has a larger ejection amount than the standard amount. In this case, blue measuring images illustrated in FIG. 6B are printed. That is, in an area on the right-hand side of the diagram, a difference in shade occurs, and measuring images different from blue images in an area on the left-hand side of the diagram are printed.

Referring again to FIG. 5A, in next Step S503, colors of the measuring images printed on the printing paper 106 as described above are measured to obtain color information B[X]. In the present embodiment, in the color measurement, the measurement images are measured by a scanner 107 provided in the printer illustrated in FIG. 1. Accordingly, processing in Step S503 includes processing of receiving scanner measurement data. Note that, a scanner separated from the printer may be used to perform the measurement based on a user's operation. Alternatively, for example, a scanner and the printer may be connected in signal to automatically input a measurement result from the scanner. In addition, the color information B[X] is, in the present embodiment, represented by a set of RGB values scanned by the scanner 107, but may be represented in any data format such as L*a*b* measured by a colorimeter.

Also, in the present embodiment, a resolution of the above measurement is 600 dpi. On the other hand, the resolution of dots to be printed is 1200 dpi corresponding to the nozzle resolution. Accordingly, in the above color measurement, an area corresponding to a nozzle group including four nozzles illustrated in FIG. 6B is measured as two pixels. Then, for each area (the above area) corresponding to two pixels in the measurement, the color information B[X] is obtained. That is, in the color information B[X], X represents a value that identifies an area, and the color information B[X] is obtained as an average of measurement results of two pixels subjected to the above measurement. In the example illustrated in FIG. 6B, the color information B[X] is obtained with the area corresponding to the nozzle group on the left-hand side of the diagram and the area corresponding to the nozzle group on the right-hand side being respectively different areas.

As described, the blue measurement images at the grid points corresponding to the device color image data D[X] meeting (R, G, B)=(0, 0, 255) are printed by ejecting the inks from all of the nozzles in the cyan and magenta printing heads 102 and 103. Then, for each area corresponding to four nozzles, the color information B[X] is obtained. FIG. 6B illustrates parts of a plurality of areas into which a printable area is divided, and in the following, the areas on the left-hand and right-hand sides of the diagram are respectively defined as a first area (X=1) and a second area (X=2). Also, color information on the first area is denoted by B[1]=G1, B1), and color information on the second area is denoted by B[2] (R2, G2, B2). In addition, the example illustrated in the right-hand side area of FIG. 6B illustrates the case where all of the nozzles in the magenta nozzle group have a larger ejection amount than the standard amount. It should be appreciated that, for example, the case where three of the four nozzles have a larger ejection amount than the standard amount and the other one has the standard ejection amount is possible, and in such a case, values of the color information B[2] on the second area to be obtained are different.

Then, in Step S504 of FIG. 5A, from a target color A=(Rt, Gt, Bt) and the color information B [X] obtained in Step S503, a color different amount T[X] in each area [X] is calculated. Here, the target color A corresponds to color data obtained by measuring, with the scanner 107, an image that is printed in the output unit 409 with use of respective color ink printing heads having the standard ejection amount on the basis of the same blue image data represented by (R, G, B)=(0, 0, 255). In the present embodiment, the resolution of the measured color data is set to 300 dpi as described above. For this reason, in Step S504 described above and Step 505 described later, and in Step S506 of the processing of generating the table parameters of the MCS processing section, data having the image resolution of 300 dpi are also handled.

That is, the color difference amount T is represented as follows:

Color difference amount $T[1]=B[1]-A=(R1-Rt, G1-Gt, B1-Bt)$, and

Color difference amount $T[2]=B[2]-A=(R2-Rt, G2-Gt, B2-Bt)$.

Here, the color difference amount T[1] represents a difference between blue as a secondary color resulting from, in the example illustrated in FIG. 6B, in the area on the left-hand side of the diagram, overlapping the cyan ink with the standard ejection amount and the magenta ink with the standard ejection amount and blue indicated by the target color data A. Except for a measurement error and the like, the color difference amount T[1] is ideally 0. That is, a relationship of R1=Rt, G1=Gt, and B1=Bt is met.

On the other hand, the color difference amount T[2] represents a difference between a blue color as a composite color resulting from, in the example illustrated in FIG. 62, in the area on the right-hand side of the diagram, a combination of the cyan ink with the standard ejection amount and the magenta ink with the larger ejection amount than the standard amount and a blue color indicated by the target color data A. For example, if blue observed on the basis of the combination of the cyan area 10623 and the magenta area 10625 is intense in cyan color as compared with the target blue color, the color difference amount T[2] becomes a color difference amount in which the cyan color is increased. The color difference is represented by a relationship of, for example, R2<Rt, G2=Gt, and B2=Bt.

Referring again to FIG. 5A, in next Step S505, from the color difference amount T[X] in each area [X], a correction value $T^{-1}[X]$ used for conversion is calculated. In the present embodiment, for simplicity, as a reverse conversion expression, the following expression is given:

$$T^{-1}[X]=-T[X]$$

Accordingly, a correction value in each area is given by:

Correction value $T^{-1}[1]=-T[1]=A-B[1]=(Rt-R1, Gt-G1, Bt-B1)$

Correction value $T^{-1}[2]=-T[2]=A-B[2]=(Rt-R2, Gt-G2, Bt-B2)$

Here, the correction value $T^{-1}[1]$ corresponds to the area on the left-hand side of FIG. 6B, and is ideally 0. On the other hand, the correction value $T^{-1}[2]$ corresponds to the area on the right-hand side of FIG. 6B, and is one that, in the above example, decreases the cyan color. That is, in the case of R2<Rt, Rt−R2 has a positive value, so that redness is increased and the cyan color is decreased.

Subsequently, in Step S506 of FIG. 5A, from the correction value $T^{-1}[X]$ for each area, an ink color conversion & MCS processing parameter G'[X] is calculated. This calculation processing is roughly divided into two processing steps, i.e., a processing step of calculating an equivalent correction value $Z^{-1}[X]$ from the correction value $T^{-1}[X]$ and a processing step of calculating the ink color conversion & MCS processing parameter G'[X] from the equivalent correction value $Z^{-1}[X]$ First, from the correction value $T^{-1}[X]$, the equivalent correction value $Z^{-1}[X]$ is calculated. In the case where the correction value $T^{-1}[X]$ is a correction value for a blue color in a measurement color space, on the basis of the correction value, the equivalent correction value $Z^{-1}[X]$ that corrects a blue color in a device color space by the same correction amount in the device color space is calculated.

Here, the equivalent correction value $Z^{-1}[1]$ is one in the area corresponding to the four nozzles in FIG. 6B, and ideally 0. On the other hand, the equivalent correction value $Z^{-1}[2]$ is one in the area on the right-hand side of the diagram, and a correction value that decreases the cyan color.

If the measurement color space and the device color space completely coincide with each other, the following expressions are met:

$$Z^{-1}[1]=T^{-1}[1]=-T[1]=A-B[1]=(Rt-R1, Gt-G1, Bt-B1)$$

$$Z^{-1}[2]=T^{-1}[2]=-T[2]=A-B[2]=(Rt-R2, Gt-G2, Bt-B2);$$

However, in practice, they do not often coincide with each other, and therefore in such a case, color space conversion is required.

If between both of the color spaces, linear conversion can be performed, a known method such as matrix conversion can be used to obtain $Z^{-1}[1]$ and $Z^{-1}[2]$ as:

$$Z^{-1}[1] = \begin{bmatrix} a1 & a2 & a3 \\ a4 & a5 & a6 \\ a7 & a8 & a9 \end{bmatrix} \times \begin{bmatrix} Rt-R1 \\ Gt-G1 \\ Bt-B1 \end{bmatrix}$$

$$Z^{-1}[2] = \begin{bmatrix} a1 & a2 & a3 \\ a4 & a5 & a6 \\ a7 & a8 & a9 \end{bmatrix} \times \begin{bmatrix} Rt-R2 \\ Gt-G2 \\ Bt-B2 \end{bmatrix}$$

Here, a1 to a9 represent conversion coefficients for converting colors in the measurement space to ink colors.

On the other hand, if between both of the color spaces, the linear conversion cannot be performed, in a similar manner, a known method such as a three-dimensional lookup table method may also be used to obtain $Z^{-1}[1]$ and $Z^{-1}[2]$ as:

$Z^{-1}[1]=F(Rt-R1,Gt-G1,Bt-B1)$, and $Z^{-1}[2]=F(Rt-R2,Gt-G2,Bt-B2)$.

Here, F is a function for converting the measurement color space to the device color space.

Also, if a relationship between the correction value $T^{-1}[X]$ and the equivalent correction value $Z^{-1}[X]$ is different depending on a color, $Z^{-1}[1]$ and $Z^{-1}[2]$ can be obtained as:

$Z^{-1}[1]=F(Rt,Gt,Bt)-F(R1,G1,B1)$, and $Z^{-1}[2]=F(Rt,Gt,Bt)-F(R2,G2,B2)$.

Here, F is also a function for converting the measurement color space to the device color space.

Next, the table parameter G'[X] in the ink color conversion and MCS processing is obtained from the equivalent correction value $Z^{-1}[X]$ as follows: Here, F(Rt, Gt, Bt) corresponds to the device color information D[X]=(dR, dG, dB) that is inputted to the ink color conversion & MCS processing section 445 to print the measurement images. Accordingly, $Z^{-1}[1]$ and $Z^{-1}[2]$ are obtained as:

$Z^{-1}[1]=(dR,dG,dB)-F(R1,G1,B1)$, and $Z^{-1}[2]=(dR,dG,dB)-F(R2,G2,B2)$.

Then, corrected ink color information C'[X] in which the inputted device color information D[X] is applied with the equivalent correction value and then subjected to the ink color conversion processing G is obtained as follows:

$C'[1]=G((dR,dG,dB)\times 2-F(R1,G1,B1))$, and $C'[2]=G((dR,dG,dB)\times 2-F(R2,G2,B2))$.

Figure 7A:
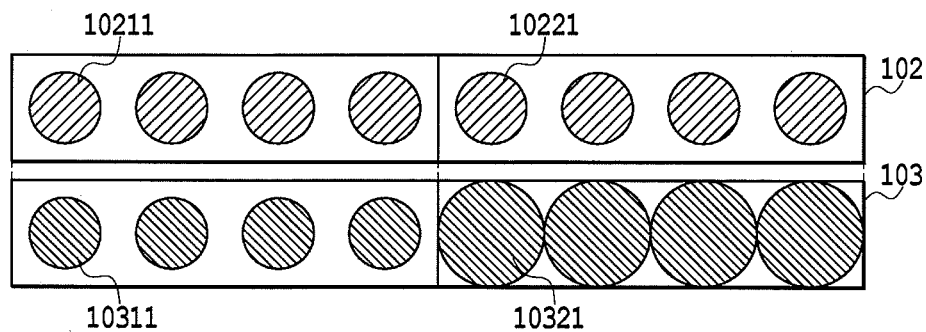
FIGS. 7A and 7B are diagrams for describing an image printed in Step S508 of FIG. 55 according to the present embodiment.
Figure 7B:
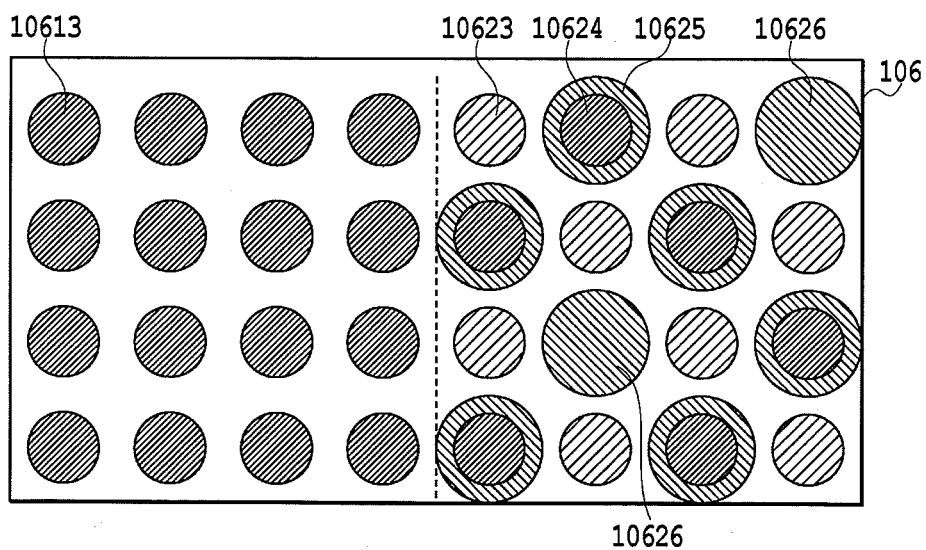

Here, the corrected ink color information C'[1] is a corrected ink color information corresponding to an area on the left-hand side of FIG. 7B, and ideally equal to G(dR, dG, dB). On the other hand, the corrected ink color information C'[2] is corrected ink color information on an area on the right-hand side of the diagram, and ink color information in which a cyan color component is decreased.

Finally, the parameter G'[X] in the ink color conversion & MCS processing is, in the same manner as the input device color data D[X] is converted to the corrected ink color information C'[X], determined as follows:

$G'[1](dR,dG,dB)=C'[1]$, and $G'[2](dR,dG,dB)=C'[2]$.

As described above, on the basis of the parameter generation processing S510 in the ink color conversion & MCS processing in FIG. 5A, the table parameter G'[X] of the conversion table of the ink color conversion & MCS processing section 445 for each area, i.e., for each corresponding nozzle group can be generated. Then, the parameter G'[X] in the ink color conversion & MCS processing for each area is stored in the HOD 303 of the host PC, which serves as a storage unit.

Next, the processing steps of the correction processing S520 by the ink color conversion & MCS processing section illustrated in FIG. 55 are described.

First, in Step S507 of FIG. 5B, the device color image data D[X] for each pixel corresponding to an area are applied with the parameter G'[X] of the ink color conversion & MCS processing section 445, which is generated in the above processing S510, to make correction.

Specifically, first, it is determined which area includes a target pixel to be subjected to the image processing, and then a printing area number n of the area including the target pixel is obtained. Here, the n-th area is set to be a target area. Then, an equivalent correction value $Z^{-1}[n]$ related to the target area is selected and obtained from equivalent correction values stored in the HDD 303 of the host PC. Subsequently, device color image data on the target pixel are applied with the parameter G'[X] for the ink color conversion & MCS processing as follows: That is, the processing in the ink color conversion & MCS processing section 445 is performed such that the device color image data D[X] is applied with the parameter G'[X] to generate the corrected ink color data C'[X].

$C'[1]=G((dR,dG,dB)\times 2-F(R1,G1,B1))$, and $C'[2]=G((dR,dG,dB)\times 2-F(R2,G2,B2))$.

Here, the corrected ink color data C'[1] are corrected ink color data corresponding to the left-hand side area in FIG. 7B, and ideally the same blue color as the target color A is obtained. Also, the corrected ink color data C'[2] are corrected ink color data corresponding to the right-hand side area, and a blue color resulting from the decrease in cyan color is obtained.

Then, in Step S508 of FIG. 5B, the corrected ink color data are printed on the printing paper 106 in the output unit 409 through the HS processing section 406, TRC processing section 407, and quantization processing section 408.

As illustrated in FIG. 7B, in each printing area of the printing paper 106, the color difference amount T [X] caused by a variation in ejection amount occurs at the time of printing, and therefore the following expressions are met:

Color information on left-hand side of printing paper≈Color on paper corresponding to $C'[1]+T[1]≈A$ Color information on right-hand side of printing paper≈Color on paper corresponding to $C'[2]+T[2]≈A$ Here, C'[1] ideally represents the same blue color as the target color A, and T[1] is ideally 0. Also, C'[2] represents a blue color in which the cyan color is decreased by an amount corresponding to T[2] with respect to the target color A, and T[2] is a color difference amount that increases the cyan color. In this manner, the blue colors on the left-hand and right-hand sides of the printing area are almost the same color, and therefore color unevenness can be reduced.

As described above, in the present embodiment, a color (set of R, G, and B) of which a color difference largely changes is printed on the printing medium as a measuring image (patch), and on the basis of a result of the measurement, the parameter of the conversion table is obtained. This is because a color different amount causing a difference in shade depends on both of (1) a color to be printed in a printing area, and (2) a combination of ejection characteristics of the respective ink colors to print the printing area, on the basis of a principle of the occurrence of the color difference amount. Here, (2) the ejection characteristics of the respective ink colors may include, in addition to the ejection amount that has been described so far, coefficients influencing a dot diameter such as a dot shape, an ink permeability, and the type of a printing medium. Also, it is clear that the color difference amount depends on a combination of printing characteristics of ink colors used to print a corresponding color, but does not depend on a printing characteristic of an unused ink color. Accordingly, depending on a color of a target pixel, the types and number of related ink colors are different, and depending on a color, only one ink color may be associated, which does not give rise to a color difference amount.

Here, as an example, the case where the measurement color space and the device color space completely coincide with each other is described. For example, in the case of a single color of cyan (R=0, G=255, B=255), densities have already been made to coincide with each other by the HS processing, and a difference in shade does not occur, so that, preferably, the correction is not performed in the MCS processing section 404. Accordingly, the equivalent correction values preferably meet the following relationship: $Z^{-1}[1]=Z^{-1}[2]=0=(0, 0, 0)$. Also, in the case of a single color of magenta (R=255, G=0, B=255), densities have also already been made to coincide with each other by the HS processing, and a difference in shade does not occur, so that, preferably, the correction is not performed in the MCS processing section 404. Accordingly, the equivalent correction values meet the following relationship: $Z^{-1}[1]=Z^{-1}[2]=0=(0, 0, 0)$.

On the other hand, in the case of the blue color (R=0, G=0, B=255), as described above with FIG. 3C, even after the HS processing has been performed, a difference in shade is likely to occur. For this reason, in the example illustrated in FIG. 6B, the equivalent correction values are set as follows:

Equivalent correction value $Z^{-1}[1]=0=(0,0,0)$, and

Equivalent correction value $Z^{-1}[2]=T^{-1}[2]=(Rt-R2, Gt-G2, Bt-B2)$.

That is, even in the case of a color signal value B=255, depending on a combination of the other colors R and G, a color difference amount is different, and therefore appropriate values of the equivalent correction values are different.

Accordingly, it is necessary for the MCS processing section 405 of the ink color conversion & MCS processing section 445 to employ a configuration in which as a color difference amount correction method (1) depending on color information, as with processing using a known three-dimensional lookup table, correction content can be set depending on the color information.

However, to attempt to reduce color unevenness over a whole of the device color space through the MCS processing section parameter generation processing 510, the processing should be repeatedly performed on a plurality of colors respectively having different color and difference amounts. For this reason, in the above-described table generation, the grid points where the color difference largely changes are selected such that each of the grid points in the table has an appropriate value of the above-described equivalent correction value as a grid point datum. Then, the MCS processing section 404 uses the three-dimensional lookup table obtained on the basis of measurement results of the measuring images of colors at the grid points appropriately selected as described above.

Figure 8:
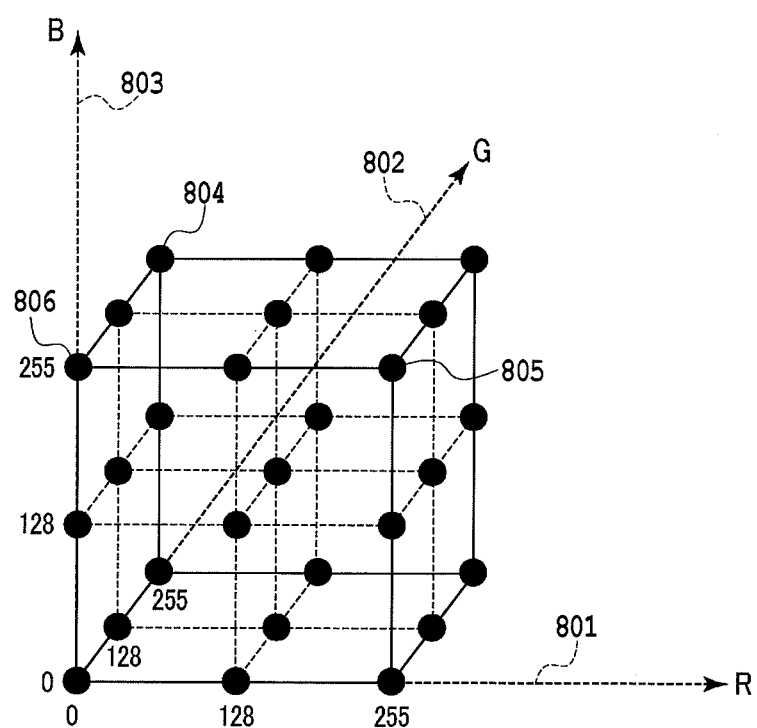
FIG. 8 is a diagram for describing another example of the processing of generating the table parameter of an MCS processing section.

As another example, the processing S510 of generating the table parameters of the MCS processing section can also be performed as follows:

First, a plurality of patches (measuring images) in which values of device colors R, G, and B are independently changed are printed with the printing heads illustrated in FIG. 1. In FIG. 8, each of the colors has three gradations of 0, 128, and 255, and printing is performed on the basis of data on combinations of them. FIG. 8 illustrates a distribution of colors at 3×3×3=27 grid points in total in the device color space. FIG. 8 represents the RGB color space, and 801, 802, and 803 respectively represent red, green, and blue axes.

The grid points indicated by black circles respectively represent colors for the patch printing. Also, the grid points indicated by 804 to 806 correspond to colors described in the present embodiment as an example, and 804, 805, and 806 respectively indicate the cyan, magenta, and blue colors. A table structure based on the grid points illustrated in FIG. 8 is the same as the table structure described above with FIGS. 5A and 5B; however a method for generating correction data is different as follows:

That is, on the basis of a calorimetric result of each of the printed patches, a patch color (Rp, Gp, Bp) closest to a target color (Rt, Gt, Bt) among device colors (Ri, Gi, Bi) is estimated for each area. Then, a device color corresponding to the estimated color is defined as a device color (Rn, Gn, Bn) of each area, which corresponds to a patch. Subsequently, the defined device color (Rn, Gn, Bn) is multiplied by an ink color conversion coefficient G to calculate an ink color (Cn, Mn, Yn, Kn). After that, a correction table that converts the device colors (Ri, Gi, Bi) to the ink color (Cn, Mn, Yn, Kn) is generated and set as a table used in the MCS processing section.

In addition, in practice, by performing printing with more gradations than those illustrated in FIG. 8, estimation accuracy can be improved, or with use of a known method such as one that interpolates a plurality of patches at the time of the estimation, the accuracy can also be improved.

Further, it's not that at the time of printing patches, the device colors R, G, and B are independently changed to perform printing, but a method that independently changes the ink colors C, M, Y, and K may be used. That is, patch colors Cp, Mp, Yp, and Kp closest to target colors Rt, Gt, and Bt in the device colors (Ri, Gi, Bi) are directly estimated to estimate ink colors Cn, Mn, Yn, and Kn corresponding to the patch color. Then, an ink color conversion & MCS correction table that converts the device colors (Ri, Gi, Bi) to the ink color (Cn, Mn, Yn, Kn) is generated. As described, the ink colors can also be independently changed, and according to this, an advantage of expanding a range of options in the ink combinations is obtained.

Also, it is necessary for the MCS processing section 405 to employ a configuration in which as in the above described (2), as a color difference amount correction method depending on printing characteristics of respective ink colors (a combination of ejection amounts of the respective ink colors) to print each printing area, correction content can be switched depending on each printing area. This can be configured such that conversion tables are held (stored) by an amount equal to the number of printing areas, and depending on a printing area, a conversion table is switched.

As described above, the present invention performs MCS processing for converting image data for an image to be printed on the print area by using the conversion table to reduce the color difference of composite color printed between the print areas, when the respective print area is printed by using inks of two or more colors. The print area is one of a plurality of unit areas into which the printable area is divided with respect to the nozzle arrangement direction. The MCS processing that is performed by using the conversion table for every print area can reduce the color difference of the composite color, that the conventional head shading processing that is performed by using one dimensional LUT can not reduce.

Further, MCS processing of the present embodiment is performed by using the conversion table that can simultaneously perform the ink conversion process at the ink conversion process unit 404 and the MCS processing. The conversion table is the conversion table that converts the image data corresponding to H, G, 3 into the image data corresponding to C, M, Y, K.

In the present embodiment, four color inks of C, M, Y, K are used. However, the present invention may adopt a manner that is further provided with inks of light cyan, light magenta and gray, etc. which have optical density different from that of C, M and K.

In the present embodiment, it is explained that the print head is provided for every ink color. However, the present invention may adopt a manner that one print head has nozzle arrays corresponding to a plurality of colors. In the case where the print head is provided for every ink color as in the present embodiment, as described by using FIGS. 12A to C, it is possible to reduce the color difference which occurs due to the effect of the arrangement error of the ejection substrate. In the case where a position of the nozzles is shifted due to the arrangement error of the ejection substrate, a color printed by using inks of two or more colors is different from a target color. The present invention can reduce the color difference which occurs in the above case because the present invention performs the above MCS processing after setting the correspondence relationship between the unit area and the nozzles used for printing the print area (the unit area). As mentioned above, it is possible to correct the composite color so as to match the characteristics of the nozzles of the print area (the unit area) by setting the correspondence relationship between the unit area and the nozzles before performing the MCS processing.

(First Variation of First Embodiment)

Next, a first variation of the above embodiment is described.

FIG. 4B is a block diagram of an image processing unit in an inkjet printer according to a first variation. In FIG. 4B, respective components indicated by reference numerals 401, and 406 to 409 are the same as those indicated by the same reference numerals in FIG. 9A, and therefore description of them is omitted. A point of difference of the present variation from the configuration illustrated in FIG. 4A is that as a conversion unit, the input color conversion processing section 403, ink color conversion processing section 404, and MCS processing section 405 are configured to be an integrated processing section (input color conversion & ink color conversion & MCS conversion processing section) 496.

Specifically, the processing section 446 uses one table in which the table of the input color conversion processing section 403, table of the ink color conversion processing section 404, and table of the MOS processing section 405 are combined. This enables the input color conversion processing, ink color conversion processing, and correction processing to be performed on input image data I[X] to output ink color image data in which color unevenness is reduced. That is, in the above embodiment, a first color signal serving as a correction processing target is set as the device color image data D[X]; however, in the present variation, the first color signal serving as the correction processing target is set as the input image data I[X].

Figure 9A:
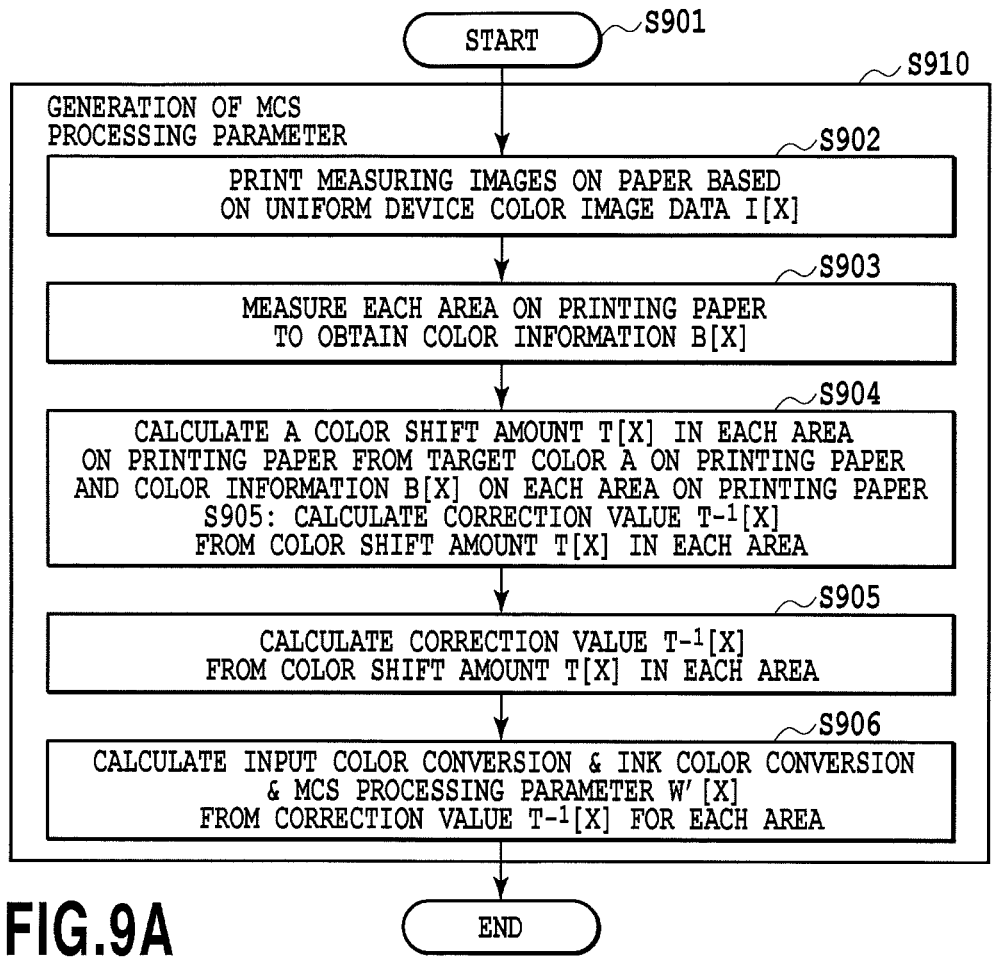
FIGS. 9A and 9B are flowcharts respectively illustrating processing of generating a parameter of a table used in a processing section 446 illustrated in FIG. 45, and processing using the table in the processing section 446.
Figure 9B:
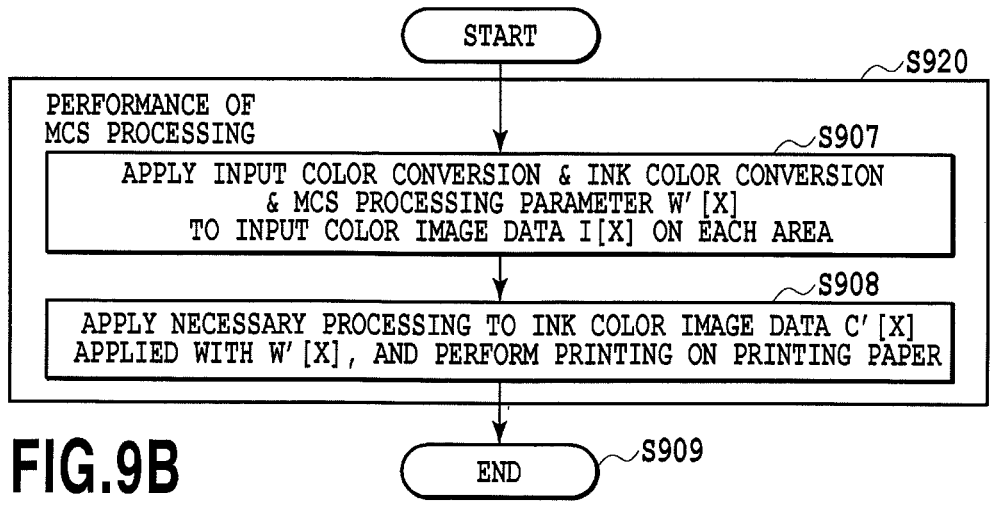

FIGS. 9A and 9B are flowcharts respectively illustrating generation of table parameters of the MCS processing section and processing in the MCS processing section according to the first variation. Here, FIG. 9A illustrates processing of generating parameters of the table used in the processing section 446, and FIG. 9B illustrates processing by the processing section 446 at the time of generating printing data.

Differences between the processing 910 illustrated in FIG. 9A and the above-described processing 510 illustrated in FIG. 5A are Steps S902 and 906. In the processing (conversion table generation processing) S910 of generating the conversion table for the input color conversion processing & ink color conversion & MCS processing in FIG. 9A, points of difference from the processing S510 in FIG. 5A are processing steps in Steps S902 and 906. In the following, the two processing steps are described.

In Step S902, on the basis of not the device image data D[X] but the input color image data I[X] from the input unit 401, measuring images for color shift correction are printed on the printing paper. At this time, the processing section 446 is adapted to function only parts corresponding to the input color conversion processing section 403 and ink color conversion processing section (first conversion unit) 404 among the input color conversion processing section 403, ink color conversion processing section 404, and MCS processing section 405. Then, the MCS processing section is skipped through a bypass processing path indicated by a dashed line 410. Specifically, the processing section 446 is configured to be able to switch the two tables corresponding to the input color conversion processing section 403, the ink color conversion processing section 409 and MCS processing section 405 to use any one of them. This switching is performed by the CPU 311 serving as a switching unit. A first table of the two tables is a table having, for the input image data I[X], a table parameter for performing a color conversion W' described below in which the input color conversion processing section 403, ink color conversion processing section 404, and MCS processing section 405 are combined. Also, a second table is a table having a table parameter for performing a processing in which the input color conversion processing 403 and ink color conversion processing are combined. At the time of printing the measuring images, the second table is used on the basis of the switching.

Given that a color conversion coefficient in the input color conversion & ink color conversion processing based on the second table used for the measuring image printing is denoted by an input color conversion W, the following relationship holds:

Device color data $D[X]$=Input color conversion $W$(Input image data $I[X]$)

Uniform device color image data D[X] obtained in this manner is, as with the above embodiment, converted printed as the measuring images in the output unit 409 through the ink color conversion processing section 405, HS processing section 406, TRC processing section 407, and quantization processing section 408. The converted image data is outputted to the out put unit 409. Output unit 409 prints the measuring images on the basis of the inputted image data.

In Step S906, from the correction value $T^{-1}[X]$ for each area, equivalent color conversion W'[X] as a table parameter in the input color conversion & ink color conversion & MCS processing is calculated. The W'[X] corresponds to color conversion in which the input color conversion W and the ink color conversion & equivalent color correction G'[X] described in the above embodiment are combined. Note that the calculation processing for the table parameter G'[X] in the ink color conversion & MCS processing is the same as that in the above embodiment, and therefore description thereof is omitted. This is the end of the generation processing for the input color conversion & ink color conversion & MCS processing parameter W'[X].

Next, a procedure of the processing performed by the processing section 446 at the time of generating printing data is described. In the processing step S907 of FIG. 9B, without passing through the bypass processing path indicated by the dashed line 410, ink color image data C'[X] in which the parameter W'[X] in the input color conversion processing & ink color conversion processing & MCS processing is used to correct a color shift is outputted to the input color image data I[X] for each area. Then, the processing in the ink color conversion processing section 406 and subsequent processing illustrated in FIG. 4B are performed on the ink color image data C'[X] to print an image on the printing paper in the output unit 409.

According to the above first variation, in Step S906, the input color conversion processing & ink color conversion processing & MCS processing parameter W'[X] is set such that the input color image data C'[X] has the same value as that in the above embodiment, and therefore as with the above embodiment, a color difference in a composite color can be reduced.

Further, in the present variation, the ink color conversion & MCS processing parameter G'[X] and the combined conversion W'[X] of the input color conversion W are held as the one three-dimensional lookup table. For this reason, the number of times to refer to the lookup table at the time of generating printing data can be decreased from twice to once, and thereby processing speed can be increased.

(Second Variation of First Embodiment)

Next, a second variation in the first embodiment of the present invention is described.

FIG. 4C is a block diagram illustrating a configuration of an image processing unit according to a second variation of the first embodiment. Generation of a table parameter of the ink color conversion & MCS processing section 445 and processing in the ink color conversion & MCS processing section 445 in the present variation are the same as those illustrated in FIGS. 5A and 5B according to the first embodiment, and a point of difference is that the HS processing section does not perform the head shading. That is, the HS processing is not performed before Step S502 illustrated in FIG. 5A.

Figure 10A:
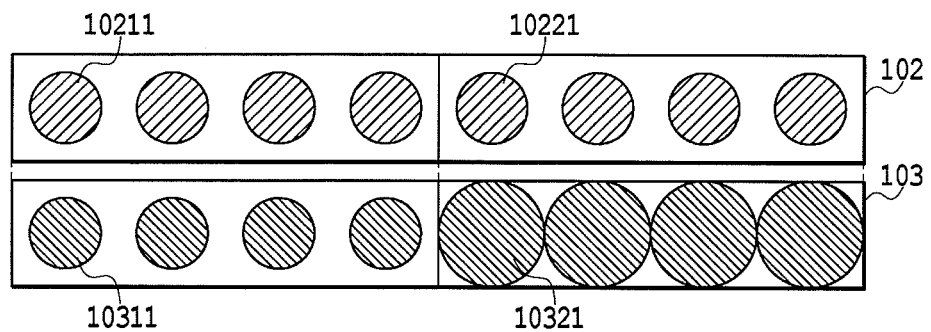
FIGS. 10A and 10B are diagrams for describing a measuring image printed in Step S502 of FIG. 5A according to a second variation.
Figure 10B:
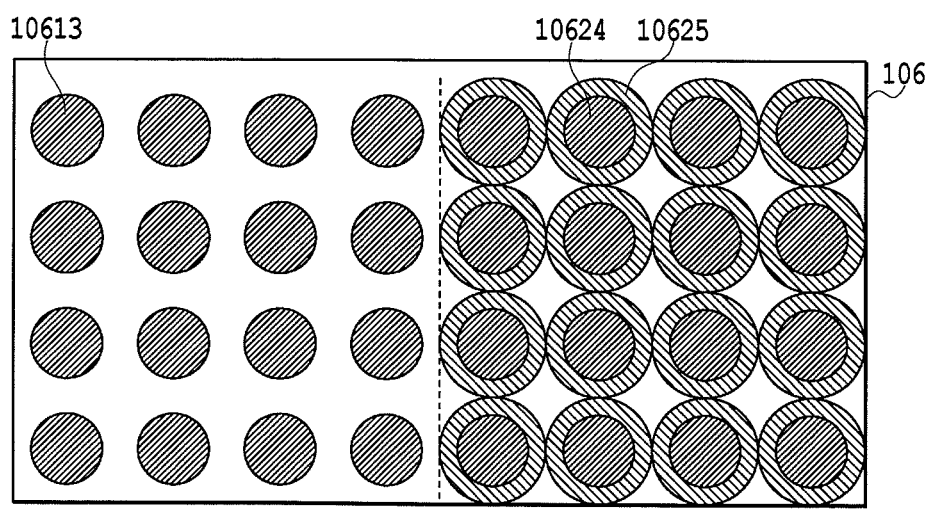

FIGS. 10A and 10B are diagrams illustrating a printing example of measuring images in Step S502 of FIG. 5A according to the present variation. As illustrated in FIG. 10B, the HS processing is not performed at the time of printing the measuring images, and therefore the number of printed dots are the same between an area 1061 corresponding to four nozzles on the left-hand side of the diagram and an area 1062 on the right-hand side of the diagram. As a result, a color of the right-hand side area is intense in magenta color as compared with the example illustrated in FIG. 6B according to the first embodiment. Accordingly, in the table parameter generation in the processing S510 of FIG. 5A, a correction value that decreases the magenta color is generated. By doing so, a correction value to obtain the printing result illustrated in FIG. 7B can be set as the table parameter in the ink color conversion & MCS processing, and therefore even in the case where the HS processing is not performed, a color difference can be reduced.

Further, according to the present variation, the HS processing is not performed, and thereby effects of increasing processing speed, reducing a resource such as a table for the HS processing, and reducing the number of processing steps because "printing", "measurement", and "correction parameter generation" for the HS processing are not performed, and other effects are obtained.

So far, the first embodiment, and the first and second variations have been described; however processing content in each of them is only an example, and any configuration can be used if the configuration can achieve a reduction in color difference of a composite color image, which is the effect of the present invention. For example, in the table parameter generation processing in the MCS processing section in FIGS. 5A and 5B or FIGS. 9A and 9B, a method that first measures a color difference amount, and then calculates a correction value is used; however, another method may be used. Also, the object is to reduce a color difference in a composite color, and therefore setting the target color A is not necessarily required. That is, on the basis of a color shift between printing areas, a correction value for each of the printing areas may be set.

Also, in the above-described embodiment, four nozzles are set as one nozzle group, and an area corresponding to one nozzle group is set as one unit area; however, without limitation to this, more nozzles may be collectively set as one nozzle group. On the other hand, less nozzle such as one nozzle may be set as one nozzle group. Also, the numbers of nozzles belonging to respective nozzle groups are not necessarily the same, but may be appropriately set depending on device characteristics. In a plurality of nozzle arrays that eject a plurality of inks, a conversion table may be related for each set of nozzle groups that perform printing in the same area on the printing medium.

(Another Embodiment)

In addition, the present invention is also realized by performing the following processing. That is, the processing is one in which software (program) that realizes the functions of the above-described embodiment is supplied to a system or device through a network or any of various types of storage media, and a computer (or CPU, MPU, or the like) of the system or device reads the program to execute it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118671, filed May 21, 2010, which is hereby incorporated by reference herein in its entirety.

What is claimed is:

1. An image processor for printing an image on a first area of a printing medium by using a first nozzle group including part of nozzles in a first nozzle array in which a plurality of first nozzles for ejecting a first ink are arranged and by using a second nozzle group including part of nozzles in a second nozzle array in which a plurality of second nozzles for ejecting a second ink are arranged, and for printing an image on a second area different from the first area of the printing medium by using a third nozzle group including a nozzle different from the nozzle of the first nozzle group in the first nozzle array and by using a fourth nozzle group including a nozzle different from the nozzle of the second nozzle group in the second nozzle array, the image processor comprising:

a first conversion unit configured to convert a plurality of color signals in input data of an image to be printed on the first area into a plurality of color signals including a color signal corresponding to the first ink and a color signal corresponding to the second ink, and to convert a plurality of color signals in input data of an image to be printed on the second area into a plurality of color signals including a color signal corresponding to the first ink and a color signal corresponding to the second ink, such that a difference between a color of an image printed by using the first nozzle group and the second nozzle group in the case where a predetermined plurality of color signals are input and a color of an image printed by using the third nozzle group and the fourth nozzle group in the case where the predetermined plurality of color signals are input is reduced,
- a second conversion unit configured to convert a color signal, converted by the first conversion unit, corresponding to the first ink to be printed on the first area and a color signal, converted by the first conversion unit, corresponding to the first ink to be printed on the second area, such that a difference between a density of an image printed on the first area by ejecting the first ink only from the first nozzle group in the case where a predetermined first color signal is input and a density of an image printed on the second area by ejecting the first ink only from the third nozzle group in the case where the predetermined first color signal is input is reduced, and to convert a color signal, converted by the first conversion unit, corresponding to the second ink to be printed on the first area and a color signal, converted by the first conversion unit, corresponding to the second ink to be printed on the second area, such that a difference between a density of an image printed on the first area by ejecting the second ink only from the second nozzle group in the case where a predetermined second color signal is input and a density of an image printed on the second area by ejecting the second ink only from the fourth nozzle group in the case where the predetermined second color signal is input is reduced.

2. The image processor according to claim 1, wherein each of the first ink and the second ink is any one of colors of cyan, magenta, yellow, and black.

3. The image processor according to claim 1, wherein the plurality of color signals input to the first conversion unit are R, G, B signals.

4. The image processor according to claim 1, wherein the plurality of color signals converted by the first conversion unit include C, M, Y signals.

5. The image processor according to claim 1, wherein the first nozzle group and the third nozzle group correspond to a predetermined number of nozzles in the first nozzle array, and the second nozzle group and the fourth nozzle group correspond to a predetermined number of nozzles in the second nozzle array.

6. The image processor according to claim 5, wherein the predetermined number is one.

7. The image processor according to claim 1, wherein by using a first conversion table corresponding to the first area, the first conversion unit converts the plurality of color signals of the input data of an image to be printed on the first area into a plurality of color signals, and by using a second conversion table corresponding to the second area, the first conversion unit converts the plurality of color signals of the input data of an image to be printed on the second area into a plurality of color signals.

8. The image processor according to claim 7, further comprising a generation unit that generates a conversion table on the basis of a result of a color measurement obtained by measuring a measurement image printed on the print medium by using the first ink and the second ink.

9. The image processor according to claim 8, further comprising a measurement unit configured to measure a color of the printed measurement image.

10. The image processor according to claim 7, wherein each of the first conversion table and the second conversion table is a look up table into which three color elements are input.

11. The image processor according to claim 1, wherein the color difference which is reduced by the first conversion unit is generated due to a difference between a combination of ejection characteristics of the first nozzle group with ejection characteristics of the second nozzle group and a combination of ejection characteristics of the third nozzle group with ejection characteristics of the fourth nozzle group.

12. The image processor according to claim 1, wherein the ejection characteristics of the first nozzle group, the ejection characteristics of the second nozzle group, the ejection characteristics of the third nozzle group, and the ejection characteristics of the fifth nozzle group indicate ejection amounts ejected from the nozzle groups.

13. An image processing method for printing an image on a first area of a printing medium by using a first nozzle group including part of nozzles in a first nozzle array in which a plurality of first nozzles for ejecting first ink are arranged and by using a second nozzle group including a part of nozzles in a second nozzle array in which a plurality of second nozzles for ejecting second ink are arranged, and for printing an image on a second area different from the first area of the printing medium by using a third nozzle group including a nozzle different from the nozzle of the first nozzle group in the first nozzle array and by using a fourth nozzle group including a nozzle different from the nozzle of the second nozzle group in the second nozzle array, the image processing method comprising:
- a first conversion step that converts a plurality of color signals in input data of an image to be printed on the first area into a plurality of color signals including a color signal corresponding to the first ink and a color signal corresponding to the second ink, and converts a plurality of color signals in input data of an image to be printed on the second area into a plurality of color signals including a color signal corresponding to the first ink and a color signal corresponding to the second ink, such that a difference between a color of an image printed by using the first nozzle group and the second nozzle group in the case where a predetermined plurality of color signals are input and a color of image printed by using the third nozzle group and the fourth nozzle group in the case where the predetermined plurality of color signals are input is reduced,
- a second conversion step that converts a color signal, converted in the first conversion step, corresponding to the first ink to be printed on the first area and a color signal, converted in the first conversion step, corresponding to the first ink to be printed on the second area, such that a difference between a density of an image printed on the first area by ejecting the first ink only from the first nozzle group in the case where a predetermined first color signal is input and a density of an image printed on the second area by ejecting the first ink only from the third nozzle group in the case where the predetermined first color signal is input is reduced, in the case where a predetermined first color signal is input, and converts a color signal, converted in the first conversion step, corresponding to the second ink to be printed on the first area and a color signal, converted in the first conversion step, corresponding to the second ink to be printed on the second area, such that a difference between a density of an image printed on the first area by ejecting the second ink only from the second nozzle group in the case where a predetermined second color signal is input and a density of an image printed on the second area by ejecting the second ink only from the fourth nozzle group in the case where the predetermined second color signal is input is reduced.

* * * * *